(12) United States Patent
Kamei et al.

(10) Patent No.: US 11,015,855 B2
(45) Date of Patent: May 25, 2021

(54) REFRIGERATION APPARATUS FOR CONTAINERS

(71) Applicant: DAIKIN INDUSTRIES, LTD., Osaka (JP)

(72) Inventors: Noritaka Kamei, Osaka (JP); Atsushi Ozato, Osaka (JP); Wataru Hirata, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 139 days.

(21) Appl. No.: 15/552,425

(22) PCT Filed: Feb. 25, 2016

(86) PCT No.: PCT/JP2016/001026
§ 371 (c)(1),
(2) Date: Aug. 21, 2017

(87) PCT Pub. No.: WO2016/136267
PCT Pub. Date: Sep. 1, 2016

(65) Prior Publication Data
US 2018/0245835 A1     Aug. 30, 2018

(30) Foreign Application Priority Data

Feb. 27, 2015  (JP) .............................. JP2015-039244

(51) Int. Cl.
*F25D 17/04* (2006.01)
*F25D 11/00* (2006.01)
(Continued)

(52) U.S. Cl.
CPC .......... *F25D 17/042* (2013.01); *A23B 7/0425* (2013.01); *A23B 7/148* (2013.01);
(Continued)

(58) Field of Classification Search
CPC ...... F25D 17/042; F25D 17/045; F25D 17/06; F25D 11/003; F25D 23/003; F25D 21/14;
(Continued)

(56) References Cited

U.S. PATENT DOCUMENTS 1,874,161 A * 8/1932 Belshaw ................... F25D 3/04
62/423
2,122,140 A * 6/1938 Henney .............. B61D 27/0018
62/93
(Continued)

FOREIGN PATENT DOCUMENTS

CN         102530392 A      7/2012
EP         0692199 A2      1/1996
(Continued)

OTHER PUBLICATIONS

International Search Report issued in PCT/JP2016/001026 (PCT/ISA/210), dated May 24, 2016.

*Primary Examiner* — Paul Alvare
*Assistant Examiner* — Kirstin U Oswald
(74) *Attorney, Agent, or Firm* — Birch, Stewart, Kolasch & Birch, LLP

(57) ABSTRACT

A container refrigeration apparatus includes: a casing which forms an external storage space communicating with the exterior of the container and an internal storage space communicating with the interior of the container; a refrigerant circuit; an external fan; an internal fan; and an inside air control system including an exhaust passage which allows a space on a blowout side of the internal fan in the internal storage space to communicate with the external storage space, and controls composition of the inside air in the container. An external end of the exhaust passage is open on a suction side of the external fan in the external storage space.

13 Claims, 11 Drawing Sheets

(51) Int. Cl.
    *F25D 21/14*    (2006.01)
    *F25D 23/00*    (2006.01)
    *A23B 7/148*    (2006.01)
    *A23B 7/04*     (2006.01)
    *F25D 17/06*    (2006.01)
    *B65D 88/74*    (2006.01)

(52) U.S. Cl.
    CPC .......... *B65D 88/745* (2013.01); *F25D 11/003* (2013.01); *F25D 17/045* (2013.01); *F25D 17/06* (2013.01); *F25D 21/14* (2013.01); *F25D 23/003* (2013.01); *A23V 2002/00* (2013.01); *F25D 2317/04* (2013.01)

(58) Field of Classification Search
    CPC ... F25D 17/08; F25D 2317/04; B65D 88/745; A23B 7/0425; A23B 7/148; A23V 2002/00
    USPC ......................................................... 62/285
    See application file for complete search history.

(56) References Cited

U.S. PATENT DOCUMENTS

| | | | | |
|---|---|---|---|---|
| 2,145,678 | A * | 1/1939 | Backstrom | F25D 11/003 62/7 |
| 2,187,569 | A * | 1/1940 | Henney | F25B 27/00 62/133 |
| 2,265,497 | A * | 12/1941 | Smith | F24F 1/00 62/262 |
| 2,422,536 | A * | 6/1947 | Finnegan | F25D 13/067 34/77 |
| 2,479,840 | A * | 8/1949 | Johnson | F25D 3/105 62/89 |
| 2,634,592 | A * | 4/1953 | Beardsley | F25D 31/00 62/62 |
| 2,949,751 | A * | 8/1960 | Henrikson | F25D 19/003 62/239 |
| 3,159,982 | A * | 12/1964 | Schachner | B60H 1/32281 62/175 |
| 3,360,380 | A * | 12/1967 | Karakian | A23B 7/148 426/312 |
| 3,385,073 | A * | 5/1968 | Snelling | F25D 3/105 62/52.1 |
| 3,415,073 | A * | 12/1968 | Ammons | F24F 13/20 62/259.1 |
| 3,421,336 | A * | 1/1969 | Lichtenberger | F25D 3/105 62/52.1 |
| 3,447,337 | A * | 6/1969 | Nelson | A23B 7/148 62/318 |
| 3,487,769 | A * | 1/1970 | Dixon | B60P 3/20 99/468 |
| 3,638,443 | A * | 2/1972 | Maurer | B60P 3/20 62/52.1 |
| 3,692,100 | A * | 9/1972 | Gallagher, Jr. | F25D 17/005 165/256 |
| 3,714,793 | A * | 2/1973 | Eigenbrod | F25D 3/105 62/62 |
| 3,848,428 | A * | 11/1974 | Rieter, Jr. | B61C 17/04 62/285 |
| 3,913,661 | A * | 10/1975 | Burg | A23B 7/148 165/222 |
| 3,918,271 | A * | 11/1975 | Whisler | B60H 1/00378 165/41 |
| 3,958,028 | A * | 5/1976 | Burg | A23B 4/066 426/418 |
| 3,961,925 | A * | 6/1976 | Rhoad | B65D 88/745 62/376 |
| RE28,995 | E * | 10/1976 | Burg | A23B 7/148 426/419 |
| 3,991,589 | A * | 11/1976 | Rath | B63J 2/08 62/62 |
| 4,003,728 | A * | 1/1977 | Rath | B60P 3/20 62/78 |
| 4,061,483 | A * | 12/1977 | Burg | A23B 4/066 62/268 |
| 4,142,372 | A * | 3/1979 | Kato | A23B 7/148 62/78 |
| 4,169,500 | A * | 10/1979 | Braver | F24F 1/0007 165/50 |
| 4,498,306 | A * | 2/1985 | Tyree, Jr. | B60H 1/3235 62/119 |
| 4,549,405 | A * | 10/1985 | Anderson | B60H 1/00014 62/239 |
| 4,748,824 | A * | 6/1988 | Wakabayashi | B60H 1/3226 62/239 |
| 4,891,954 | A * | 1/1990 | Thomsen | B61D 27/0081 62/239 |
| 4,936,100 | A * | 6/1990 | Leppa | B60P 3/205 62/175 |
| 4,936,104 | A * | 6/1990 | Hicke | B60P 3/20 62/211 |
| 4,951,479 | A * | 8/1990 | Araquistain | B60H 1/3235 105/355 |
| 4,979,431 | A * | 12/1990 | Fujimoto | B60H 1/3232 454/91 |
| 5,042,266 | A * | 8/1991 | Yamashita | F24F 3/14 62/271 |
| 5,063,753 | A * | 11/1991 | Woodruff | A23L 3/3418 62/239 |
| 5,090,209 | A * | 2/1992 | Martin | F25D 29/001 62/156 |
| 5,222,373 | A * | 6/1993 | Waldschmidt | B60H 1/00014 62/239 |
| 5,259,198 | A * | 11/1993 | Viegas | B60H 1/00007 62/7 |
| 5,267,443 | A * | 12/1993 | Roehrich | F24F 5/0017 62/50.3 |
| 5,287,705 | A * | 2/1994 | Roehrich | B60H 1/3202 62/50.3 |
| 5,305,825 | A * | 4/1994 | Roehrich | F25D 29/001 165/61 |
| 5,313,787 | A * | 5/1994 | Martin | F25D 29/001 62/222 |
| 5,320,167 | A * | 6/1994 | Johnson | F25D 29/001 165/64 |
| 5,341,653 | A * | 8/1994 | Tippmann | F25D 11/003 62/280 |
| 5,438,841 | A * | 8/1995 | Cahill-O'Brien | A23L 3/3418 426/418 |
| 5,457,963 | A * | 10/1995 | Cahill-O'Brien | G05D 21/02 62/78 |
| 5,499,514 | A * | 3/1996 | Ho | F25D 17/047 62/291 |
| 5,515,693 | A | 5/1996 | Cahill-O'Brien et al. | |
| 5,557,942 | A | 9/1996 | Kim et al. | |
| 5,609,037 | A * | 3/1997 | Fischler | B60H 1/3229 62/239 |
| 5,623,105 | A * | 4/1997 | Liston | A23L 3/3418 422/3 |
| 5,660,057 | A * | 8/1997 | Tyree, Jr. | B61D 27/0081 62/239 |
| 5,729,983 | A * | 3/1998 | Garrett | A23L 3/363 62/46.1 |
| 5,795,370 | A | 8/1998 | Garrett et al. | |
| 5,799,495 | A * | 9/1998 | Gast, Jr. | A23B 7/148 62/78 |
| 5,872,721 | A * | 2/1999 | Huston | A23B 7/148 702/24 |
| 6,044,648 | A * | 4/2000 | Rode | F25D 3/10 62/50.2 |
| 6,105,383 | A * | 8/2000 | Reimann | B60H 1/00371 62/244 |
| 6,202,434 | B1 * | 3/2001 | Hearne, Jr. | A23B 7/0433 62/304 |
| 6,357,249 | B1 * | 3/2002 | Robinson | B60H 1/00364 62/244 |

(56) References Cited

U.S. PATENT DOCUMENTS

| | | | | |
|---|---|---|---|---|
| 6,360,548 B1* | 3/2002 | Navarro | | A47F 3/001 62/279 |
| 6,374,626 B1* | 4/2002 | Takahashi | | B60H 1/3232 62/239 |
| 6,513,282 B2* | 2/2003 | Schott | | A01M 13/003 43/125 |
| 6,694,765 B1* | 2/2004 | Waldschmidt | | B60H 1/00014 62/234 |
| 6,698,212 B2* | 3/2004 | Viegas | | B60H 1/3202 62/201 |
| 6,751,966 B2* | 6/2004 | Viegas | | B60H 1/3205 62/131 |
| 6,895,764 B2* | 5/2005 | Viegas | | B60H 1/00257 62/237 |
| 6,923,111 B2* | 8/2005 | Kiefer | | A23B 7/144 62/239 |
| 6,996,997 B2* | 2/2006 | Wiff | | F25D 29/003 62/127 |
| 8,037,704 B2* | 10/2011 | Viegas | | F25D 17/08 62/239 |
| 8,266,917 B2* | 9/2012 | Waldschmidt | | B60H 1/323 62/115 |
| 10,101,081 B2* | 10/2018 | Viegas | | F25J 3/04478 |
| 2002/0026805 A1* | 3/2002 | Takahashi | | F25D 21/14 62/239 |
| 2003/0019219 A1* | 1/2003 | Viegas | | G05D 23/1931 62/50.2 |
| 2004/0216469 A1* | 11/2004 | Viegas | | F25D 29/003 62/50.2 |
| 2004/0244382 A1* | 12/2004 | Hagen | | F23L 7/00 60/775 |
| 2006/0277934 A1* | 12/2006 | Cho | | F25D 21/14 62/285 |
| 2009/0133420 A1* | 5/2009 | Kitamura | | F25D 19/003 62/259.1 |
| 2009/0211298 A1* | 8/2009 | Saul | | F25D 11/003 62/640 |
| 2010/0189849 A1* | 7/2010 | Tracy | | A23B 7/152 426/231 |
| 2013/0055728 A1* | 3/2013 | Lurken | | F17C 9/00 62/7 |
| 2013/0118195 A1* | 5/2013 | Ikemiya | | F25B 49/00 62/126 |
| 2014/0202183 A1* | 7/2014 | Chadwick | | A23L 3/3418 62/78 |
| 2016/0227802 A1* | 8/2016 | Tanaka | | F25D 11/003 |
| 2016/0245555 A1* | 8/2016 | Tanaka | | F25D 17/042 |
| 2017/0219270 A1* | 8/2017 | Yokohara | | F25D 21/14 |
| 2017/0311616 A1* | 11/2017 | Schaefer | | F24F 11/30 |
| 2018/0245835 A1* | 8/2018 | Kamei | | A23B 7/148 |

FOREIGN PATENT DOCUMENTS

| | | | | |
|---|---|---|---|---|
| EP | 1243879 A2 * | 9/2002 | | F25D 11/003 |
| EP | 3045844 A1 * | 7/2016 | | B01D 53/047 |
| JP | 61-10143 Y2 | 4/1986 | | |
| JP | 63-72483 U | 5/1988 | | |
| JP | 7-190602 A | 7/1995 | | |
| JP | 8-167 A | 1/1996 | | |
| JP | 9-105577 A | 4/1997 | | |
| JP | 2635535 B2 | 7/1997 | | |
| JP | 2006-52913 A | 2/2006 | | |
| JP | 2012-136287 A | 7/2012 | | |
| WO | WO-9737545 A1 * | 10/1997 | | A23B 7/148 |

* cited by examiner

REFRIGERATION APPARATUS FOR CONTAINERS

TECHNICAL FIELD

The present invention relates to a container refrigeration apparatus which cools air in a container and controls the composition of the air in the container.

BACKGROUND ART

Container refrigeration apparatuses including a refrigerant circuit performing a refrigeration cycle have been used to cool air in a container for use in, e.g., marine transportation (see, e.g., Patent Document 1). The container is loaded with plants such as bananas and avocados, for example. Plants perform respiration by absorbing oxygen in the air and releasing carbon dioxide even after they have been harvested. The plants lose their nourishment and moisture as they respire. Thus, if the respiration rate of the plants increases, the degree of freshness of the plants decreases significantly. Thus, it is recommended that the oxygen concentration in the container be lowered not to cause respiratory problems.

Patent Document 1 discloses an internal environment control system which separates nitrogen in the air using a membrane separator to generate nitrogen-enriched air with a higher nitrogen concentration than the atmospheric air, and feeds the nitrogen-enriched air into a container to reduce an oxygen concentration of the air in the container. When the oxygen concentration of the air in the container is lowered by the internal environment control system, the respiration rate of the plants decreases, and the degree of freshness of the plants may easily be maintained.

To keep the plants fresh, a carbon dioxide concentration of the air in the container needs to be controlled appropriately in addition to the oxygen concentration. Thus, if the carbon dioxide concentration in the air in the container exceeds an upper limit value as the plants respire, the air in the container needs to be exhausted outside. According to a generally known container refrigeration apparatus, an exhaust passage which allows a blowout side of an internal fan and the outside of the container to communicate with each other, and an exhaust valve which opens or closes the exhaust passage are provided. The air in the container is exhausted outside by using a pressure difference between an inlet and outlet of the exhaust passage produced through rotation of the internal fan.

CITATION LIST

Patent Documents

[Patent Document 1] Japanese Patent No. 2635535

SUMMARY OF THE INVENTION

Technical Problem

According to the above-described container refrigeration apparatus, a cooling operation is performed to lower the temperature of the air in the container. Thus, the pressure in the container may become lower than the pressure outside the container (atmospheric air). In such a case, the pressure difference between the inlet and outlet of the exhaust passage may cause a backflow of the air from the outside to the inside of the container. That is, it has been difficult for generally known inside air control systems to exhaust the air in the container outside if the pressure in the container is lower than the pressure of the outside air.

In view of the foregoing background, it is therefore an object of the present invention to provide a container refrigeration apparatus including an inside air control system which controls the composition of the air in a container, wherein the air in the container can be exhausted out of the container even if the pressure in the container is lower than the outside pressure.

Solution to the Problem

A first aspect of the present invention is directed to a container refrigeration apparatus including: a casing (12) which is attached to an open end of a container (11) for housing a respiring plant (15), and forms an external storage space (S1) communicating with the exterior of the container (11) and an internal storage space (S2) communicating with the interior of the container (11); a refrigerant circuit (20) in which a condenser (22) disposed in the external storage space (S1) and an evaporator (24) disposed in the internal storage space (S2) are connected together to perform a refrigeration cycle; an external fan (25) which is disposed in the external storage space (S1), and guides outside air into the external storage space (S1) to form a flow of the outside air toward the condenser (22); an internal fan (26) which is disposed in the internal storage space (S2), and guides inside air in the container (11) into the internal storage space (S2) to form a flow of the inside air toward the evaporator (24); and an inside air control system (60) which includes a gas supply device (30) which supplies nitrogen-enriched air having a higher nitrogen concentration than the outside air to the internal storage space (S2), and an exhaust passage (46a) which allows a space on a blowout side of the internal fan (26) in the internal storage space (S2) to communicate with the external storage space (S1), and controls composition of the inside air in the container (11), wherein an external end of the exhaust passage (46a) is open on a suction side of the external fan (25) in the external storage space (S1).

According to the first aspect of the invention, a refrigeration cycle is performed in the refrigerant circuit (20) and the internal fan (26) rotates. Then, the refrigerant circulates in the refrigerant circuit (20), thereby allowing the inside air to circulate in the container (11). The inside air guided toward the evaporator (24) by the internal fan (26) is cooled by the refrigerant in the refrigerant circuit (20) when passing through the evaporator (24). Further, the inside air control system (60) supplies nitrogen-enriched air into the container (11), and allows the air in the container (11) to be exhausted out of the container (11) via the exhaust passage (46a), thereby controlling the composition of the air in the container (11) to a desired state.

Moreover, according to the first aspect of the invention, an external end of the exhaust passage (46a) is open on a suction side of the external fan (25) in the external storage space (S1). Rotation of the external fan (25) allows the pressure on the suction side of the external fan (25) to become lower than the pressure on the blowout side of the internal fan (26). Thus, even if the pressure in the container (11) is lower than the pressure of the outside air, the external fan (25) allows the pressure in a space, in which an internal end of the exhaust passage (46a) opens, to become higher than the pressure in a space in which the external end of the exhaust passage (46a) opens. Due to the pressure difference between the ends of the exhaust passage (46a) caused by the rotation of the external fan (25), the air in the internal storage space (S2) communicating with the interior of the container (inside air) can be smoothly exhausted out of the container via the exhaust passage (46*a*).

A second aspect of the present invention is an embodiment of the first aspect of the invention. According to the second aspect, the external storage space (S1) is divided by the condenser (22) into a first space (S11) upstream of the condenser (22), and a second space (S12) downstream of the condenser (22) in a direction of the flow of the outside air. The second space (S12) is closed such that only a blowout port of the external fan (25) is open toward the exterior of the container, and the external end of the exhaust passage (46*a*) is open in the second space (S12).

According to the second aspect of the invention, the second space (S12), in which the external fan (25) is disposed and which is closed such that only a blowout port of the external fan (25) is open toward the exterior of the container, serves as a space on the suction side of the external fan (25) into which the air is sucked through the external fan (25). According to the second aspect of the invention, the external end of the exhaust passage (46*a*) is open in this second space (S12). Thus, the rotation of the external fan (25) allows the pressure in the second space (S12), in which the external end of the exhaust passage (46*a*) opens, to become lower than the pressure on the blowout side of the internal fan (26) around which an internal end of the exhaust passage (46*a*) opens. Due to the pressure difference between the ends of the exhaust passage (46*a*) caused by the rotation of the external fan (25), the air in the internal storage space (S2) communicating with the interior of the container (inside air) can be smoothly exhausted out of the container via the exhaust passage (46*a*).

A third aspect of the present invention is an embodiment of the first aspect of the invention. According to the third aspect, the external storage space (S1) is divided by the condenser (22) into a first space (S11) upstream of the condenser (22), and a second space (S12) downstream of the condenser (22) in a direction of the flow of the outside air, and an external portion of the exhaust passage (46*a*) extending in the external storage space (S1) is at least partially disposed in the second space (S12).

If the outside air temperature is remarkably low and is lower than the temperature of the air in the container (11), the air may be abruptly cooled to cause the condensation in the external portion of the exhaust passage (46*a*) guiding the air from the interior to exterior of the container (11). Condensed water generated in the exhaust passage (46*a*) may be exhausted from the downstream end of the exhaust passage (46*a*) together with the air in the container, and sprayed onto the external fan (25) or the condenser (22), thereby causing corrosion of the external fan (25) or the condenser (22).

Thus, according to the third aspect, the external portion of the exhaust passage (46*a*) is at least partially disposed in the second space (S12) of the exterior storage space (S1) downstream of the condenser (22) in the direction of the flow of the outside air. With the exhaust passage (46*a*) thus arranged, the air flowing from the interior to exterior of the container (11) via the exhaust passage (46*a*) is heated in the external portion of the exhaust passage (46*a*) by the outside air that has been heated by the refrigerant when passing through the condenser (22).

A fourth aspect of the present invention is an embodiment of the third aspect of the invention. According to the fourth aspect, the external portion of the exhaust passage (46*a*) is entirely disposed in the second space (S12).

According to the fourth aspect, the external portion of the exhaust tube (46*a*) is entirely disposed in the second space (S12) of the exterior storage space (S1) downstream of the condenser (22) in the direction of the flow of the outside air. With the exhaust passage (46*a*) thus arranged, the air flowing from the interior of the container into the exhaust passage (46*a*) is heated in the entire external portion of the exhaust passage (46*a*) by the outside air that has been heated by the refrigerant when passing through the condenser (22).

A fifth aspect of the present invention is an embodiment of any one of the first to third aspects of the invention. According to the fifth aspect, the exhaust passage (46*a*) is made of a tube (46*a*) which is inserted in a through hole (12*d*) formed through the casing (12) to penetrate the casing (12), and a draining structure (90) which drains condensed water generated in the tube (46*a*) out of the container is provided in an external portion of the tube (46*a*) extending in the external storage space (S1).

According to the fifth aspect, the draining structure (90) which drains condensed water generated in the tube (46*a*) out of the container is provided in the external portion of the tube (46*a*) constituting the exhaust passage (46*a*). Thus, condensed water generated in the tube (46*a*) is drained outside via the draining structure (90), which may prevent the condensed water from flowing into the interior of the container.

A sixth aspect of the invention is an embodiment of the fifth aspect of the invention. According to the sixth aspect, the draining structure (90) includes a trap (91) which forms part of the tube (46*a*) and stores the condensed water, and a draining tube (93) connected to the trap (91) and guides the condensed water stored in the trap (91) outside.

According to the sixth aspect, condensed water generated in the tube (46*a*) is stored in the trap (91) forming part of the tube (46*a*), and is drained outside via the draining tube (93) connected to the trap (91).

A seventh aspect of the invention is an embodiment of the fifth aspect of the invention. According to the seventh aspect, the draining structure (90) is disposed in the external portion of the tube (46*a*) to be adjacent to the through hole (12*d*).

In the tube (46*a*) guiding the air from the interior to exterior of the container (11), there is a high possibility that the air in a portion of the tube (46*a*) penetrating the casing (12), i.e., a portion around the through hole (12*d*), is abruptly cooled by the outside air to cause condensation.

According to the seventh aspect, the draining structure (90) is provided in the external portion of the tube (46*a*) to be adjacent to the through hole (12*d*). Thus, condensed water generated in the tube (46*a*) is trapped near the condensation spot, and drained outside.

An eighth aspect of the present invention is an embodiment of the fifth aspect of the invention. According to the eighth aspect, the external storage space (S1) is divided into a first space (S11) upstream of the condenser (22), and a second space (S12) downstream of the condenser (22) in a direction of the flow of the outside air, and part of the external portion of the tube (46*a*) downstream of the draining structure (90) is disposed in the second space (S12).

If condensation occurred in part of the external portion of the tube (46*a*) upstream of the draining structure (90), condensed water would be drained outside by the draining structure (90). However, if condensation occurred in part of the external portion of the tube (46*a*) downstream of the draining structure (90), condensed water would be exhausted from the downstream end of the tube (46*a*) together with the air in the container, and sprayed onto the external fan (25) or the condenser (22), thereby causing corrosion of the external fan (25) or the condenser (22).

Thus, according to the eighth aspect, part of the external portion of the tube (46*a*) downstream of the draining structure (90) is disposed in the second space (S12) of the exterior storage space (S1) downstream of the condenser (22) in the direction of the flow of the outside air. With the tube (46*a*) thus arranged, condensed water, if generated in part of the external portion of the tube (46*a*) upstream of the draining structure (90), may be drained outside by the draining structure (90). Further, the air flowing in part of the external portion of the tube (46*a*) downstream of the draining structure (90) is heated by the outside air that has been heated by the refrigerant when passing through the condenser (22). This may substantially prevent the condensation from occurring.

Advantages of the Invention

According to the first and second aspects of the invention, the external end of the exhaust passage (46*a*) is open on the suction side of the external fan (25) in the exterior storage space (S1). Thus, rotation of the external fan (25) allows the pressure on the suction side of the external fan (25), around which the external end of the exhaust passage (46*a*) opens, to become lower than the pressure on the blowout side of the internal fan (26) around which the internal end of the exhaust passage (46*a*) opens. Thus, even if the pressure in the container (11) is lower than the outside pressure, the external fan (25) allows the pressure in a space in which the internal end of the exhaust passage (46*a*) opens to become higher than the pressure in a space in which the external end of the exhaust passage (46*a*) opens. Due to the pressure difference between the ends of the exhaust passage (46*a*) caused by the rotation of the external fan (25), the air in the internal storage space (S2) communicating with the interior of the container (inside air) can be smoothly exhausted out of the container. Therefore, the composition of the air in the container (oxygen concentration and carbon dioxide concentration) may quickly and accurately be controlled to a desired composition.

Further, according to the third aspect, the external portion of the exhaust tube (46*a*) is at least partially disposed in the second space (S12) of the exterior storage space (S1) downstream of the condenser (22) in the direction of the flow of the outside air. With the exhaust passage (46*a*) thus arranged, the air flowing from the interior to exterior of the container (11) via the exhaust passage (46*a*) is heated in the external portion of the exhaust passage (46*a*) by the outside air that has been heated by the refrigerant when passing through the condenser (22). Thus, even if the outside air temperature is remarkably low, condensation of moisture in the air flowing in the external portion of the exhaust passage (46*a*) may be substantially prevented.

According to the fourth aspect, the external portion of the exhaust tube (46*a*) is entirely disposed in the second space (S12) of the exterior storage space (S1) downstream of the condenser (22) in the direction of the flow of the outside air. With the exhaust passage (46*a*) thus arranged, the air flowing from the interior of the container into the exhaust passage (46*a*) is heated in the entire external portion of the exhaust passage (46*a*) by the outside air that has been heated by the refrigerant when passing through the condenser (22). This may lower the possibility of condensation in the entire external portion of the exhaust passage (46*a*). Consequently, condensed water generated in the exhaust passage (46*a*) would not be exhausted from the end of the exhaust passage (46*a*) together with the air in the container, or sprayed onto the external fan (25) or the condenser (22), thereby substantially preventing corrosion of the external fan (25) or the condenser (22) due to adhesion of condensed water.

Further, according to the fifth aspect, a draining structure (90) which drains condensed water out of the container is provided in the external portion of the tube (46*a*) forming the exhaust passage (46*a*), in which condensation may possibly occur. Thus, condensed water generated in the exhaust tube (46*a*) can be drained outside via the draining structure (90), which may prevent the condensed water from flowing into the interior of the container.

Moreover, according to the sixth aspect, the draining structure (90) can easily be comprised of the trap (91) which forms part of the tube (46*a*) and the draining tube (93) connected to the trap (91).

Furthermore, according to the seventh aspect, the draining structure (90) is provided in the external portion of the tube (46*a*) to be adjacent to the through hole (12*d*). Thus, condensed water generated in the tube (46*a*) may be trapped near the condensation spot, and drained outside.

In addition, according to the eighth aspect, part of the external portion of the tube (46*a*) downstream of the draining structure (90) is disposed in the second space (S12) of the exterior storage space (S1) downstream of the condenser (22) in the direction of the flow of the outside air. With the tube (46*a*) thus arranged, condensed water, if generated in part of the external portion of the tube (46*a*) upstream of the draining structure (90), may be drained outside by the draining structure (90). On the other hand, the air flowing in part of the external portion of the tube (46*a*) downstream of the draining structure (90) is heated by the outside air that has been heated by the refrigerant when passing through the condenser (22). This may prevent the condensation itself from occurring. Consequently, condensed water generated in the tube (46*a*) would not be exhausted from the end of the exhaust tube (46*a*) together with the air in the container, or sprayed onto the external fan (25) or the condenser (22), thereby substantially preventing corrosion of the external fan (25) or the condenser (22) due to adhesion of condensed water.

DESCRIPTION OF EMBODIMENTS

Embodiments of the present invention will now be described in detail with reference to the drawings. Note that the following description of embodiments is merely examples in nature, and is not intended to limit the scope, application, or uses of the present invention.

First Embodiment

Figure 1:
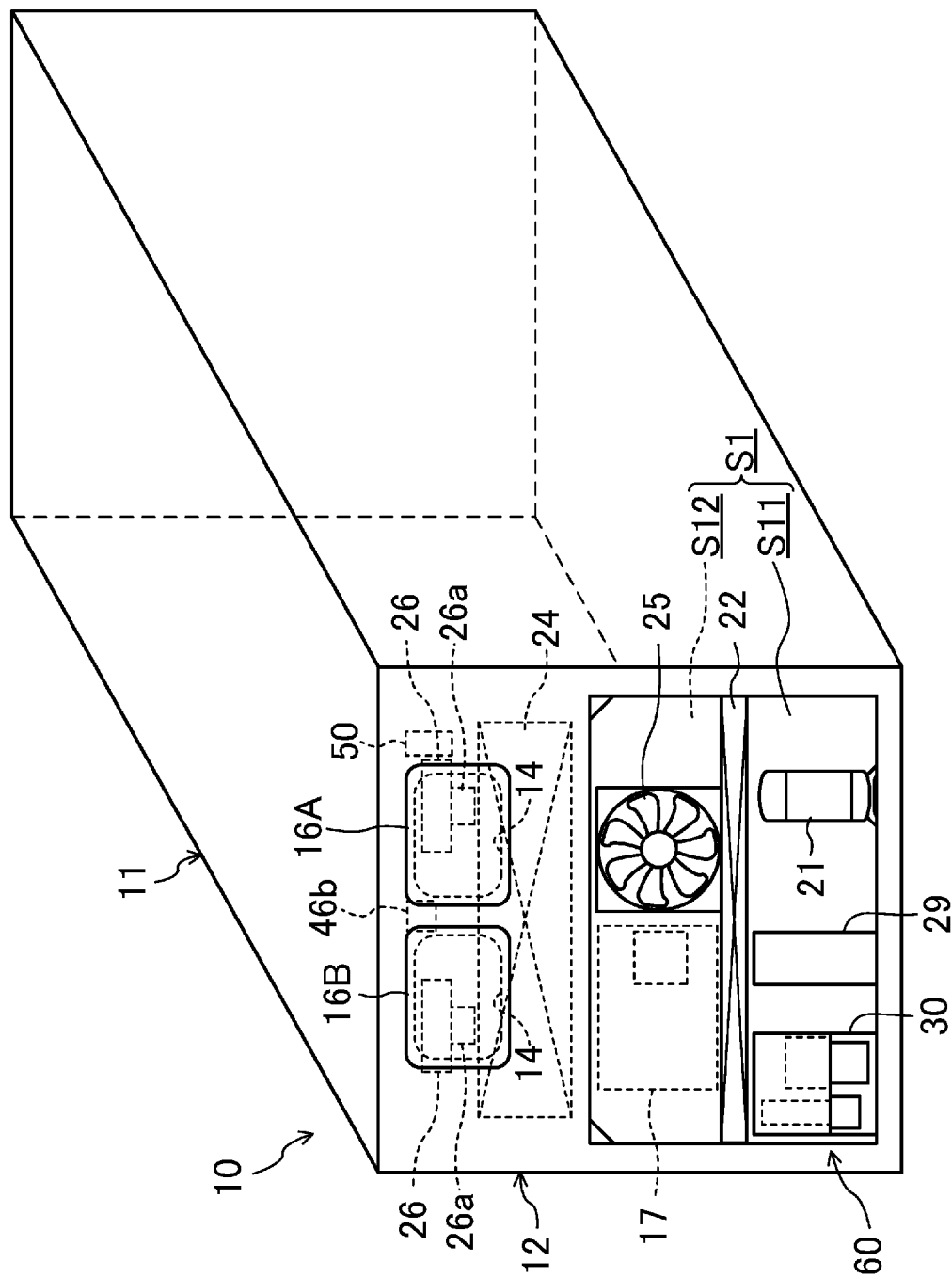
FIG. 1 is a perspective view illustrating a container refrigeration apparatus of a first embodiment as viewed from outside.
Figure 2:
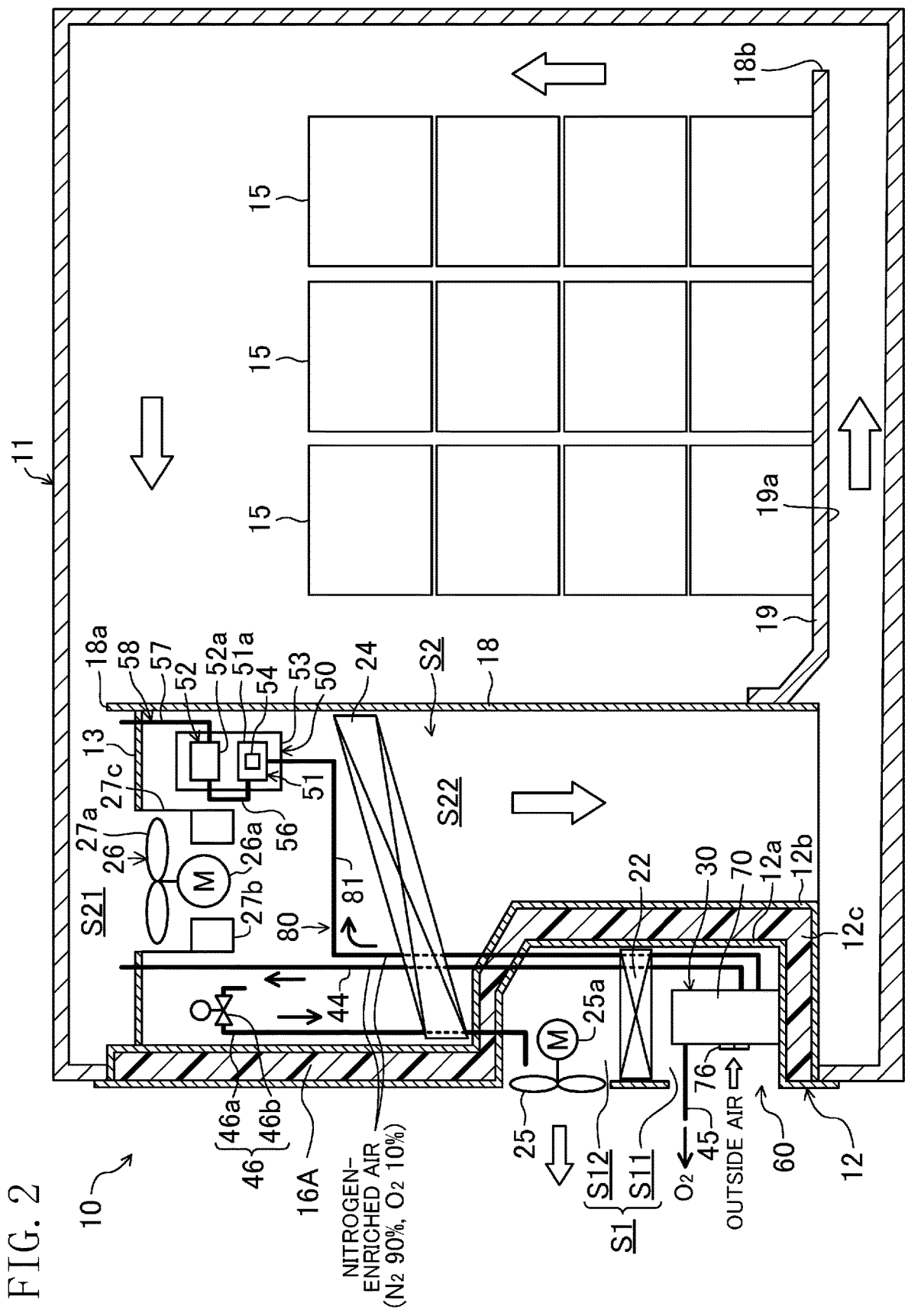
FIG. 2 is a cross-sectional view illustrating a general configuration of the container refrigeration apparatus of the first embodiment.

As shown in FIGS. 1 and 2, a container refrigeration apparatus (10) is provided for a container (11) for use in, e.g., marine transportation, and cools the air in the container (11). Boxed plants (15) are stored in the container (11). The plants (15) perform respiration by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere system (CA system) (60), and is attached to close an open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container (11) just like the lower part of the exterior wall (12a). A thermal insulator (12c) fills the space between the interior and exterior walls (12b, 12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) partitions the internal storage space (S2) vertically such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) through which the air which has been cooled by the container refrigeration apparatus (10) is blown into the container (11) is provided at an end of the floorboard (19) opposite from the open end of the container (11) (on the right side in FIG. 2).

<Refrigerant Circuit>

Figure 3:
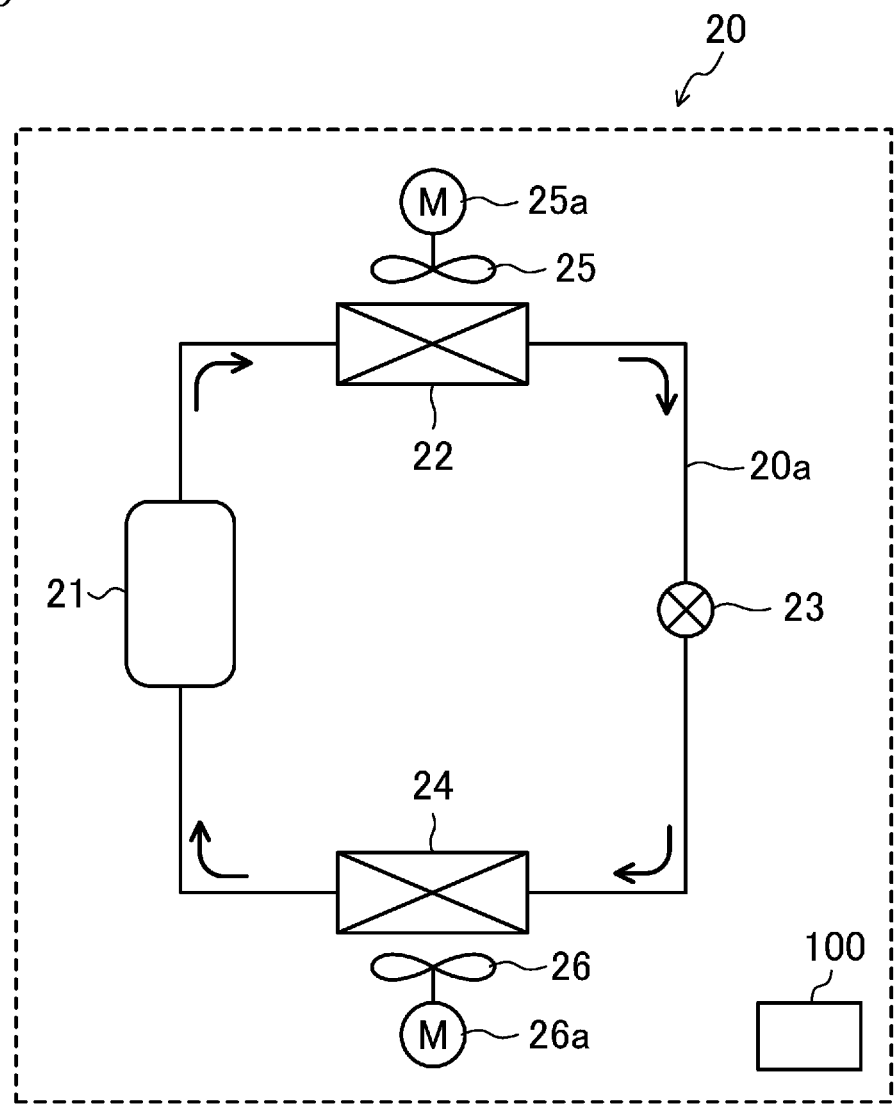
FIG. 3 is a piping diagram illustrating a configuration of a refrigerant circuit in the container refrigeration apparatus of the first embodiment.

As shown in FIG. 3, the refrigerant circuit (20) is a closed circuit in which a compressor (21), a condenser (22), an expansion valve (23), and an evaporator (24) are connected together in this order by refrigerant piping (20a).

An external fan (25) is disposed near the condenser (22). The external fan (25) is driven in rotation by an external fan motor (25a), guides the air in the exterior of the container (11) (outside air) into the external storage space (S1), and sends it to the condenser (22). In the condenser (22), heat is exchanged between a refrigerant compressed in the compressor (21) and flowing through the condenser (22) and the outside air sent from the external fan (25) to the condenser (22). In this embodiment, the external fan (25) is comprised of a propeller fan.

Two internal fans (26) are disposed near the evaporator (24). The internal fans (26) are driven in rotation by internal fan motors (26a), and guide the air in the container (11) through a suction port (18a) to blow the air toward the evaporator (24). In the evaporator (24), heat is exchanged between a refrigerant flowing through the evaporator (24) and having its pressure decreased by the expansion valve (23) and the air in the container sent to the evaporator (24) by the internal fans (26).

As shown in FIG. 2, each of the internal fans (26) includes a propeller fan (rotary vane) (27a), a plurality of stationary vanes (27*b*), and a fan housing (27*c*). The propeller fan (27*a*) is coupled to the internal fan motor (26*a*), and driven in rotation by the internal fan motor (26*a*) about a rotation axis to blow the air in an axial direction. The plurality of stationary vanes (27*b*) is disposed on the blowout side of the propeller fan (27*a*) to rectify the flow of swirling air blown from the propeller fan (27*a*). The fan housing (27*c*) is comprised of a cylindrical member with the plurality of stationary vanes (27*b*) attached to its inner peripheral surface, and extends to, and surrounds, the outer periphery of the propeller fan (27*a*).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). The condenser (22) is a fin-and-tube air heat exchanger, and allows the air to flow between the lower first space (S11) and the upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electrical component box (17) are disposed in the second space (S12). The first space (S11) is open toward the exterior of the container (11). A plate member is arranged to close the second space (S12) from the front (a front surface in FIG. 1) such that only a blowout port of the external fan (25) is open toward the exterior of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<CA System>

Figure 4:
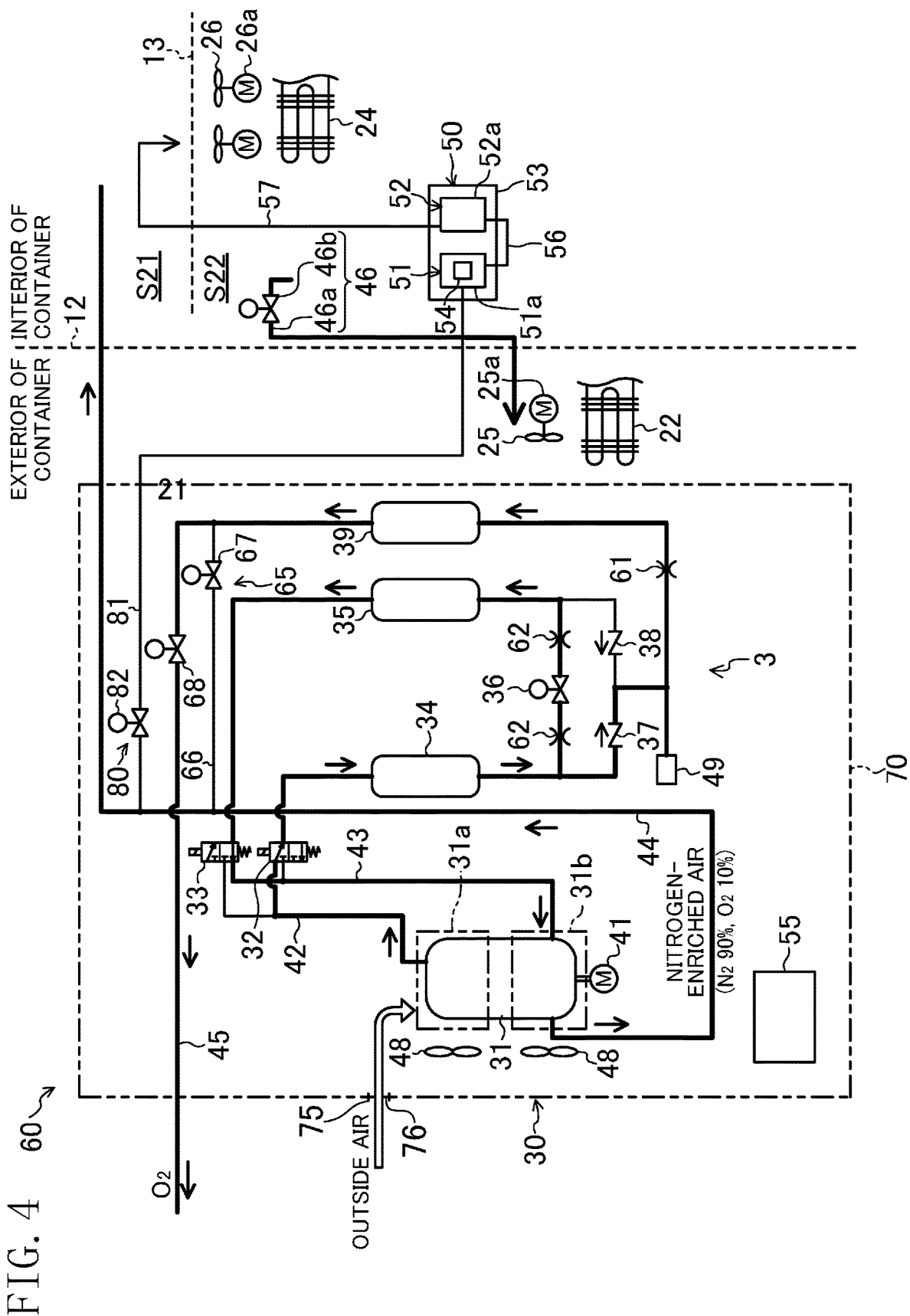
FIG. 4 is a piping diagram illustrating a configuration of a CA system in the container refrigeration apparatus of the first embodiment, together with the flow of air during a first flow state.

As shown in FIG. 4, the CA system (60) includes a gas supply device (30), an exhaust portion (46), a sensor unit (50), a measurement unit (80), and a controller (55), and controls the oxygen concentration and carbon dioxide concentration of the air in the container (11). The term "concentration" to be used in the following description always indicates a "volumetric concentration."

[Gas Supply Device]
—Configuration of Gas Supply Device—

The gas supply device (30) produces nitrogen-enriched air with a low oxygen concentration to be supplied into the container (11). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes an air circuit (3) connecting an air pump (31), first and second directional control valves (32) and (33), first and second adsorption columns (34) and (35) each provided with an adsorbent for adsorbing nitrogen in the air, and an oxygen tank (39), and a unit case (70) housing these components of the air circuit (3). In this manner, the gas supply device (30) forms a single unit with these components housed in the unit case (70), and is configured to be retrofitted to the container refrigeration apparatus (10).

(Air Pump)

The air pump (31) is provided in the unit case (70), and includes first and second pump mechanisms (31*a*) and (31*b*), each of which sucks and compresses the air to discharge compressed air. The first and second pump mechanisms (31*a*) and (31*b*) are connected to a driving shaft of a motor (41), and are driven in rotation by the motor (41) to suck and compress the air, and discharge the compressed air.

An inlet of the first pump mechanism (31*a*) opens in the unit case (70), and an air-permeable, waterproof membrane filter (76) is provided for an air inlet (75) of the unit case. Thus, the first pump mechanism (31*a*) sucks and compresses the outside air from which moisture has been removed when flowing from the outside to inside of the unit case (70) through the membrane filter (76) provided for the air inlet (75). On the other hand, an outlet of the first pump mechanism (31*a*) is connected to one end of a discharge passage (42). The other end (downstream end) of the discharge passage (42) is divided into two branches, which are connected to a first directional control valve (32) and a second directional control valve (33), respectively.

An inlet of the second pump mechanism (31*b*) is connected to one end of a suction passage (43). The other end (upstream end) of the suction passage (43) is divided into two branches, which are connected to the first and second directional control valves (32) and (33), respectively. On the other hand, an outlet of the second pump mechanism (31*b*) is connected to one end of a supply passage (44). The other end of the supply passage (44) opens in the first space (S21) on the suction side of the internal fans (26) in the internal storage space (S2) of the container (11). The supply passage (44) is made of a flexible tube (hereinafter referred to as a "supply tube (44)").

The first and second pump mechanisms (31*a*) and (31*b*) of the air pump (31) are configured as oil-free pumps without lubricant oil. Specifically, suppose that oil is used in the pump of the first pump mechanism (31*a*). In such a situation, when the first and second adsorption columns (34) and (35) are pressurized by being supplied with the compressed air, the oil included in the compressed air is adsorbed onto the adsorbent, resulting in a decreased adsorption performance of the adsorbent.

On the other hand, if oil is used in the pump of the second pump mechanism (31*b*), the oil is supplied to the interior of the container (11) together with the nitrogen-enriched air containing nitrogen desorbed from the first and second adsorption columns (34) and (35). That is to say, in that case, the nitrogen-enriched air with an oily smell is supplied to the interior of the container (11) loaded with plants (15).

Thus, this embodiment is configured to overcome such a disadvantage by implementing the first and second pump mechanisms (31*a*) and (31*b*) of the air pump (31) as oil-free pumps.

Two blower fans (48) are disposed on the side of the air pump (31) to cool the air pump (31) by blowing air to the air pump (31).

(Directional Control Valve)

The first and second directional control valves (32) and (33) are provided in the air circuit (3) between the air pump (31) and the first and second adsorption columns (34) and (35), and switches the connection between the air pump (31) and the first and second adsorption columns (34) and (35) between a first connection state and a second connection state. The controller (55) controls the switching.

Specifically, the first directional control valve (32) is connected to the discharge passage (42) connected to the outlet of the first pump mechanism (31*a*), the suction passage (43) connected to the inlet of the second pump mechanism (31*b*), and the top of the first adsorption column (34). The first directional control valve (32) switches between a first state where the first adsorption column (34) is allowed to communicate with the outlet of the first pump mechanism (31*a*) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a).

The second directional control valve (33) is connected to the discharge passage (42) connected to the outlet of the first pump mechanism (31a), the suction passage (43) connected to the inlet of the second pump mechanism (31b), and the top of the second adsorption column (35). This second directional control valve (33) switches between a first state where the second adsorption column (35) is allowed to communicate with the inlet of the second pump mechanism (31b) to be blocked from the outlet of the first pump mechanism (31b) (the state shown in FIG. 4), and a second state where the second adsorption column (35) is allowed to communicate with the outlet of the first pump mechanism (31a) to be blocked from the inlet of the second pump mechanism (31b).

If the first and second directional control valves (32) and (33) are set to be the first state, the air circuit (3) is switched to the first connection state where the outlet of the first pump mechanism (31a) is connected to the first adsorption column (34), and the inlet of the second pump mechanism (31b) is connected to the second adsorption column (35). In this state, an adsorption operation is performed on the first adsorption column (34) to adsorb nitrogen in the outside air onto the adsorbent, and a desorption operation is performed on the second adsorption column (35) to desorb nitrogen adsorbed onto the adsorbent. On the other hand, if the first and second directional control valves (32) and (33) are set to be the second state, the air circuit (3) is switched to the second connection state where the outlet of the first pump mechanism (31a) is connected to the second adsorption column (35), and the inlet of the second pump mechanism (31b) is connected to the first adsorption column (34). In this state, the adsorption operation is performed on the second adsorption column (35), and the desorption operation is performed on the first adsorption column (34).

(Adsorption Column)

The first and second adsorption columns (34) and (35) are configured as cylindrical members filled with an adsorbent, and are disposed upright (i.e., disposed such that each axis direction thereof is a vertical direction). The adsorbent that fills the first and second adsorption columns (34) and (35) absorbs nitrogen in a state where the adsorption columns (34, 35) are pressurized, and desorbs nitrogen in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. Nitrogen in the air may be absorbed by using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with nitrogen as a result of the desorption operation. Consequently, nitrogen-enriched air including moisture is supplied to the interior of the container (11), thus increasing the humidity in the container (11). Furthermore, the adsorbent is regenerated, which may extend the adsorbent's life.

In this configuration, if the air pump (31) supplies the compressed outside air to the first and second adsorption columns (34) and (35) to pressurize these columns (34) and (35), nitrogen in the outside air is adsorbed onto the adsorbent. This produces oxygen-enriched air that has had its nitrogen concentration lowered and oxygen concentration increased by including less nitrogen than the outside air does. On the other hand, if the air pump (31) sucks the air from the first and second adsorption columns (34) and (35) to depressurize these columns (34) and (35), the nitrogen adsorbed onto the adsorbent is desorbed. This produces nitrogen-enriched air that has had its nitrogen concentration increased and oxygen concentration lowered by including more nitrogen than the outside air does. In this embodiment, this nitrogen-enriched air may be 90% nitrogen and 10% oxygen, for example.

The respective lower ends of the first and second adsorption columns (34) and (35) (functioning as outlets during pressurization and inlets during depressurization) are connected to one end of an oxygen exhaust passage (45) through which the oxygen-enriched air that has been produced in the first and second adsorption columns (34) and (35) being supplied with the compressed outside air by the first pump mechanism (31a) is guided toward the outside of the container (11). The one end of the oxygen exhaust passage (45) is divided into two branches, which are connected to the lower ends of the first and second adsorption columns (34) and (35), respectively. The other end of the oxygen exhaust passage (45) opens outside the gas supply device (30), i.e., outside the container (11). One of the two branches of the one end of the oxygen exhaust passage (45), i.e., the one connected to the lower end of the first adsorption column (34), is provided with a first check valve (37) which prevents backflow of the air from the oxygen exhaust passage (45) to the first adsorption column (34). The other branch of the oxygen exhaust passage (45) connected to the lower end of the second adsorption column (35) is provided with a second check valve (38) which prevents backflow of the air from the oxygen exhaust passage (45) to the second adsorption column (35).

The two branches of the one end of the oxygen discharge passage (45) are connected with each other via a purge valve (36), and an orifice (62) is provided between the purge valve (36) and each of the branches. The purge valve (36) is used to introduce a predetermined amount of the oxygen-enriched air into an adsorption column being depressurized (the second adsorption column (35) in FIG. 4) from an adsorption column being pressurized (the first adsorption column (34) in FIG. 4) to support the release of nitrogen from the adsorbent of the adsorption columns (35, 34) being depressurized. The controller (55) controls an opening/closing operation of the purge valve (36).

The oxygen tank (39) is provided at some midpoint of the oxygen exhaust passage (45), and an orifice (61) is provided between the oxygen tank (39) and the first and second check valves (37) and (38). The oxygen tank (39) temporarily retains the oxygen-enriched air produced in the first and second adsorption columns (34) and (35). The oxygen-enriched air produced in the first and second adsorption columns (34) and (35) is depressurized by the orifice (61), and is then temporarily retained in the oxygen tank (39).

A pressure sensor (49) which measures the pressure of the compressed air supplied from the first pump mechanism (31a) to the first and second adsorption columns (34) and (35) is connected between the orifice (61) of the oxygen exhaust passage (45) and the first and second check valves (37) and (38).

<Flow Switching Mechanism>

The air circuit (3) further includes a flow switching mechanism (65) which switches the state of flow of the air in the air circuit (3) between a first flow state where the nitrogen-enriched air produced in the first and second adsorption columns (34) and (35) is supplied into the container (11) by the air pump (31), and a second flow state where the air in the air circuit (3) having the same composition as the outside air is supplied into the container (11) by the air pump (31).

In this embodiment, the flow switching mechanism (65) includes a connection passage (66), a first open/close valve (67), and a second open/close valve (68). The connection passage (66) connects the supply passage (44) and a portion of the oxygen discharge passage (45) closer to the exterior of the container (11) than the oxygen tank (39). The first open/close valve (67) is provided on the oxygen exhaust passage (45) to be located further toward the outside of the container (11) than the junction between the oxygen exhaust passage (45) and the connection passage (66). The second open/close valve (68) which opens/closes the oxygen exhaust passage (45) is provided for the connection passage (66).

The controller (55) controls an opening/closing operation of the first and second open/close valves (67) and (68). If the controller (55) operates the air pump (31) with the first open/close valve (67) closed and the second open/close valve (68) opened, the flow state of the air in the air circuit (3) is switched to the first flow state (the state shown in FIG. 4). On the other hand, if the controller (55) operates the air pump (31) with the first open/close valve (67) opened and the second open/close valve (68) closed, the flow state of the air in the air circuit (3) is switched to the second flow state (the state shown in FIG. 5).

In this embodiment, as will be described in detail later, the nitrogen-enriched air produced in the first and second adsorption columns (34) and (35) is allowed to merge with the oxygen-enriched air to produce air having the same composition as the outside air, which is supplied into the container (11) during the second flow state.

—Operation Mechanism of Gas Supply Device—

The gas supply device (30) alternately repeats a first operation in which the first adsorption column (34) is pressurized and the second adsorption column (35) is depressurized, and a second operation in which the first adsorption column (34) is depressurized and the second adsorption column (35) is pressurized every predetermined time (e.g., 15 seconds) so as to produce the nitrogen-enriched air and the oxygen-enriched air. The controller (55) controls the first and second directional control valves (32) and (33) to perform the switching between the first and second operations.

<<First Operation>>

During the first operation, the controller (55) switches the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a).

The first pump mechanism (31a) supplies the compressed outside air to the first adsorption column (34). Nitrogen contained in the air flowed into the first adsorption column (34) is adsorbed on the adsorbent of the first adsorption column (34). Thus, during the first operation, the compressed outside air is supplied from the first pump mechanism (31a) to the first adsorption column (34), in which the adsorbent adsorbs nitrogen in the outside air, thereby producing the oxygen-enriched air having a lower nitrogen concentration and a higher oxygen concentration than the outside air. The oxygen-enriched air flows from the first adsorption column (34) to the oxygen exhaust passage (45).

On the other hand, the second pump mechanism (31a) sucks the air from the second adsorption column (35). Simultaneously, the second pump mechanism (31b) also sucks nitrogen adsorbed onto the adsorbent in the second adsorption column (35) together with the air, thereby allowing the adsorbent to desorb nitrogen. Thus, during the first operation, the second pump mechanism (31b) sucks the air out of the second adsorption column (35) to allow the adsorbent to desorb nitrogen adsorbed thereon. This produces nitrogen-enriched air containing the nitrogen desorbed from the adsorbent, and having a higher nitrogen concentration and a lower oxygen concentration than the outside air. The nitrogen-enriched air is sucked into the second pump mechanism (31b), compressed, and discharged toward the supply passage (44).

<<Second Operation>>

During the second operation, the controller (55) switches the first and second directional control valves (32) and (33) to the second state opposite from the state shown in FIG. 4. Thus, the air circuit (3) is set to the second connection state where the first adsorption column (34) communicates with the inlet of the second pump mechanism (31b) and is blocked from the outlet of the first pump mechanism (31b), and simultaneously, the second adsorption column (35) communicates with the outlet of the first pump mechanism (31a) and is blocked from the inlet of the second pump mechanism (31b).

The first pump mechanism (31a) supplies the compressed outside air to the second adsorption column (35). Nitrogen contained in the air flowed into the second adsorption column (35) is adsorbed on the adsorbent of the second adsorption column (35). Thus, during the second operation, the first pump mechanism (31a) supplies the compressed outside air to the second adsorption column (35), in which the adsorbent adsorbs nitrogen in the outside air, thereby producing oxygen-enriched air having a lower nitrogen concentration and a higher oxygen concentration than the outside air. The oxygen-enriched air flows from the second adsorption column (35) to the oxygen exhaust passage (45).

On the other hand, the second pump mechanism (31b) sucks the air from the first adsorption column (34). Simultaneously, the second pump mechanism (31b) also sucks nitrogen adsorbed onto the adsorbent in the first adsorption column (34) together with the air, thereby allowing the adsorbent to desorb nitrogen. Thus, during the second operation, the second pump mechanism (31b) sucks the air out of the first adsorption column (34) to allow the adsorbent to desorb nitrogen adsorbed thereon. This produces nitrogen-enriched air containing the nitrogen desorbed from the adsorbent, and having a higher nitrogen concentration and a lower oxygen concentration than the outside air. The nitrogen-enriched air is sucked into the second pump mechanism (31b), compressed, and discharged toward the supply passage (44).

In this manner, the gas supply device (30) alternately repeats the first and second operations to produce the nitrogen-enriched air and the oxygen-enriched air in the air circuit (3). Further, in the gas supply device (30), the flow switching mechanism (65) switches the flow state of the air in the air circuit (3) between the first and second flow states.

<<Operation in First Flow State>>

Specifically, the controller (55) operates the air pump (31) with the first open/close valve (67) closed and the second open/close valve (68) opened, thereby switching the flow state of the air in the air circuit (3) to the first flow state shown in FIG. 4. In the first flow state, just like in a generally known gas supply device, oxygen-enriched air produced in the first and second adsorption columns (34) and (35) is exhausted out of the container (11) via the oxygen exhaust passage (45) by the pressure applied by the first pump mechanism (31a) of the air pump (31), while the nitrogen-enriched air produced in the first and second adsorption columns (34) and (35) is supplied into the container (11) via the supply passage (44) by the pressure applied by the second pump mechanism (31b) of the air pump (31). That is, in the first flow state, a gas supply operation is performed in which the nitrogen-enriched air produced in the first and second adsorption columns (34) and (35) is supplied into the container (11) by the pressure applied by the second pump mechanism (31b) of the air pump (31).

<<Operation in Second Flow State>>

Figure 5:
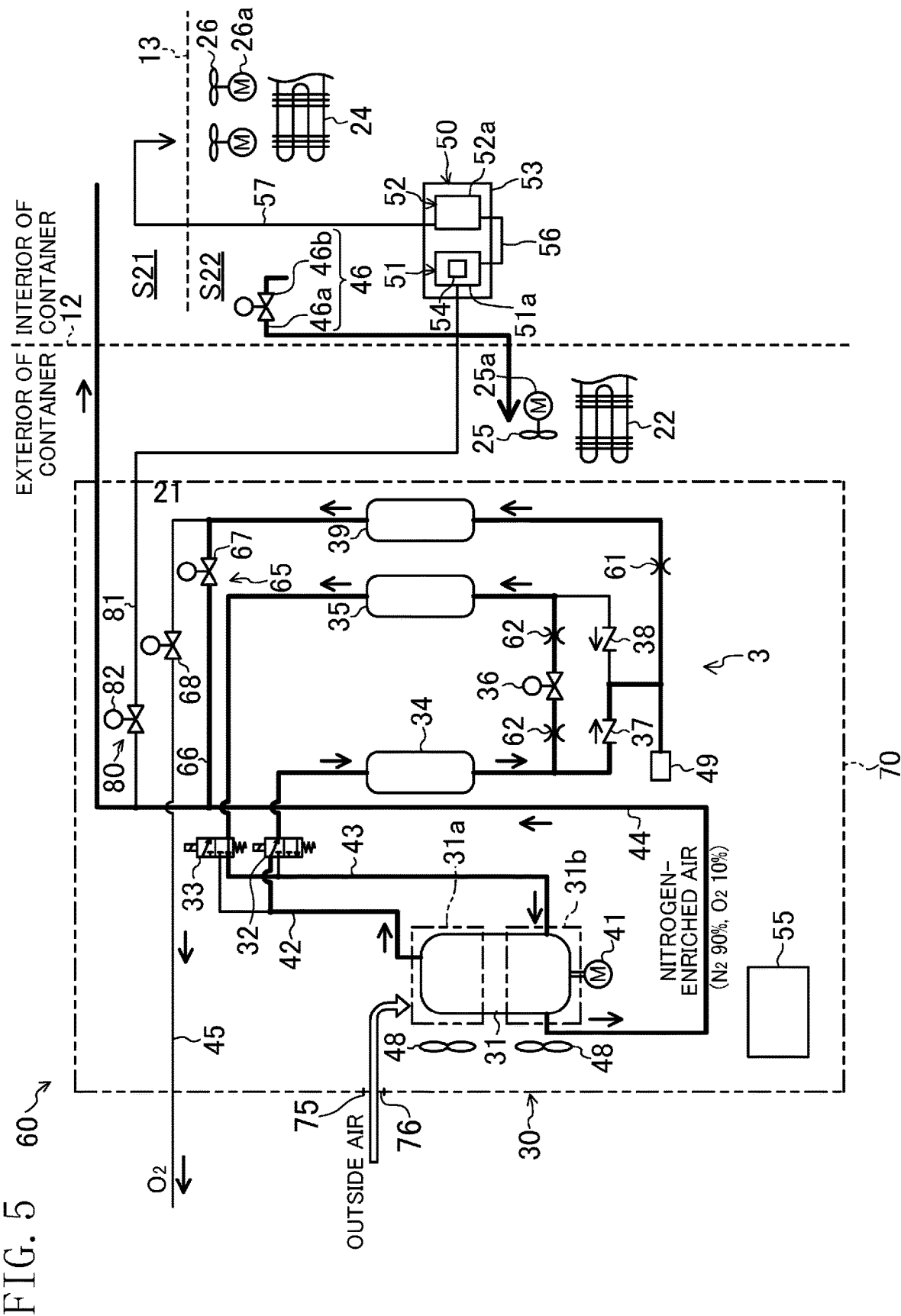
FIG. 5 is a piping diagram illustrating the configuration of the CA system in the container refrigeration apparatus of the first embodiment, together with the flow of air during a second flow state.

On the other hand, if the controller (55) operates the air pump (31) with the first open/close valve (67) opened and the second open/close valve (68) closed, the flow state of the air in the air circuit (3) is switched to the second flow state shown in FIG. 5. In the second flow state, the first and second adsorption columns (34) and (35) are blocked from the outside of the gas supply device (30) (the exterior of the container), and the oxygen exhaust passage (45) and the supply passage (44) are connected via the connection passage (66). Thus, the oxygen-enriched air produced in the first and second adsorption columns (34) and (35) is pushed from the oxygen exhaust passage (45) into the supply passage (44) via the connection passage (66) by the pressure applied by the first pump mechanism (31a) of the air pump (31). In the supply passage (44), the pressure applied by the second pump mechanism (31b) of the air pump (31) allows the nitrogen-enriched air produced in the first and second adsorption columns (34) and (35) to flow toward the interior of the container (11). Thus, the oxygen-enriched air merges with the flow of the nitrogen-enriched air at the junction of the supply passage (44) and the connection passage (66), which produces air having the same composition as the outside air. The air having the same composition as the outside air produced in the supply passage (44) is supplied into the container (11) by the pressure applied by the second pump mechanism (31b) of the air pump (31). Thus, in the second flow state, an outside air introduction operation is performed in which the air having the same composition as the outside air is supplied into the container (11) by the pressure applied by the second pump mechanism (31b) of the air pump (31).

[Exhaust Portion]

As shown in FIG. 2, the exhaust portion (46) includes an exhaust passage connecting the internal storage space (S2) and the exterior of the container, and an exhaust valve (46b) connected to the exhaust passage (46a).

Figure 6A:
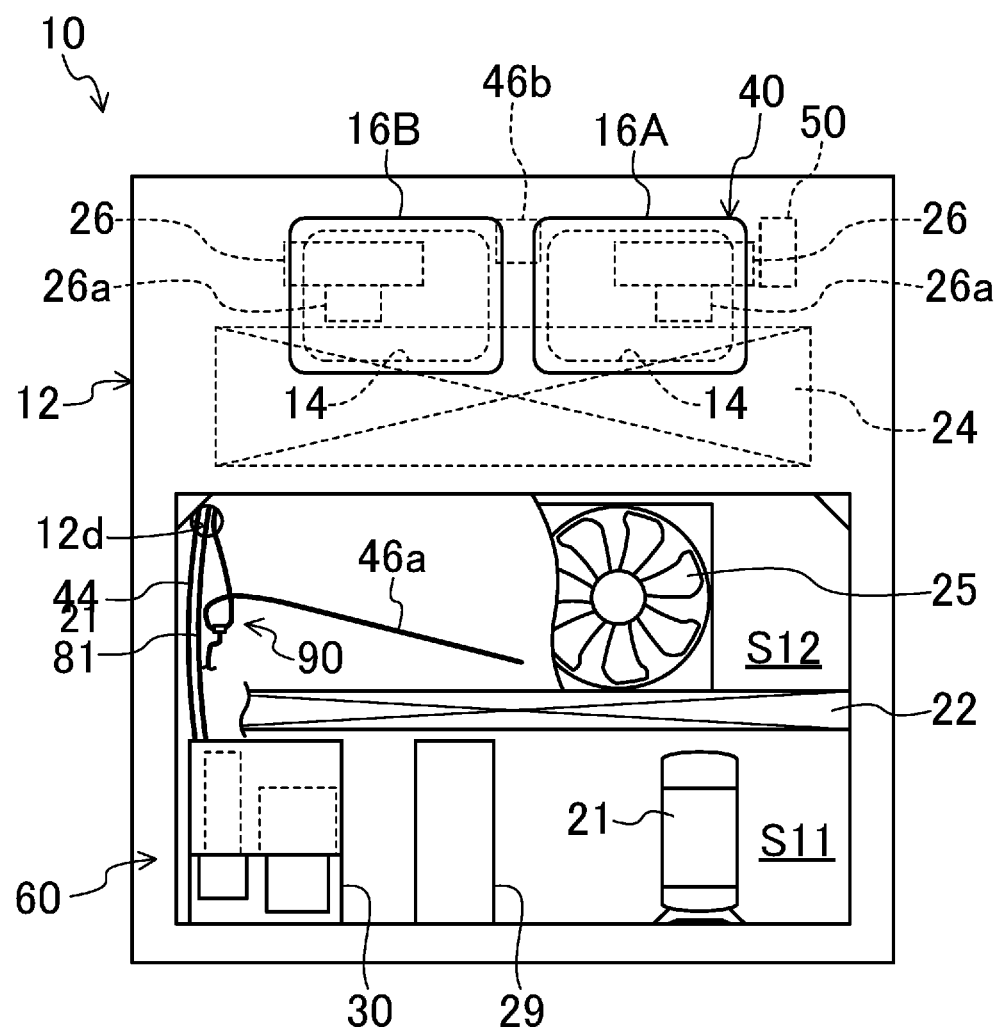
FIG. 6(A) is a side view illustrating the container refrigeration apparatus of the first embodiment as viewed from outside.

As shown in FIG. 6(A), the exhaust passage (46a) is made of a flexible tube (hereinafter referred to as an "exhaust tube (46a)"). The exhaust tube (46a) is inserted in a through hole (12d) connecting the internal storage space (S2) formed in the casing (12) and the second space (S12) of the external storage space (S1), thereby penetrating the casing (12). The exhaust tube (46a) has an inlet end which opens in the secondary space (S22) on the blowout side of the internal fans (26), and an outlet end which opens in the second space (S12) of the external storage space (S1). Specifically, the outlet end of the exhaust tube (46a) opens near a motor (25a) arranged on the suction side of the external fan (25), which is a propeller fan, in the second space (S12).

The second space (S12) is closed such that only a blowout port of the external fan (25) is open toward the exterior of the container. In this configuration, the second space (S12) serves as a suction space into which the air is sucked via the external fan (25) during the operation of the external fan (25). In the present embodiment, the outlet end of the exhaust tube (46a) is disposed in the space on the suction side of the external fan (25). On the other hand, the exhaust valve (46b) is provided adjacent to an internal end of the exhaust tube (46a), and is comprised of a solenoid valve which is switched between an open state where the air is allowed to flow through the exhaust tube (46a), and a closed state where the air is prevented from flowing through the exhaust tube (46a). The controller (55) controls an opening/closing operation of the exhaust valve (46b).

In this configuration, the exhaust portion (46) performs, when the external fan (25) is rotating, an exhaust operation in which the controller (55) opens the exhaust valve (46b) to exhaust the air (inside air) in the internal storage space (S2) communicating with the interior of the container out of the container. Specifically, when the external fan (25) is rotating, the pressure of the second space (S12) on the suction side of the external fan (25) becomes lower than the pressure of an exterior space (atmospheric pressure). Further, if the amount of air supplied by the external fan (25) increases, the pressure of the second space (S12) on the suction side of the external fan (25) is further lowered. Thus, the external fan (25) is rotated such that the pressure of the second space (S12) on the suction side of the external fan (25) becomes lower than the pressure of the secondary space (S22) on the blowout side of the internal fans (26). As a result, the air (inside air) in the internal storage space (S2) communicating with the interior of the container may be guided to the outside due to the pressure difference between the inlet and outlet ends of the exhaust tube (46a).

Depending on the temperature of the air in the container (11), the pressure of the interior of the container (11) may become lower than the pressure of the external space of the container (atmospheric pressure). However, controlling the amount of air supplied by the external fan (25) easily allows the pressure of the secondary space (S22) on the blowout side of the internal fans (26), in which the inlet end of the exhaust tube (46a) opens, to become higher than the pressure of the external space of the container (atmospheric pressure) in which the outlet end of the exhaust tube (46a) opens.

[Sensor Unit]

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51a) housing a galvanic-cell sensor therein. The oxygen sensor (51) measures the value of a current flowing through an electrolytic solution of the galvanic cell-type sensor to measure the oxygen concentration of a gas in the oxygen sensor box (51a). An outer surface of the oxygen sensor box (51a) is fixed to the fixing member (53). Another outer surface of the oxygen sensor box (51a) opposite from the outer surface fixed to the fixing member (53) has an opening, to which the membrane filter (54), which is air-permeable and waterproof, is attached. Further, a branch pipe (81) of a measurement unit (80), which will be described later, is coupled via a connector (pipe joint) to a lower surface of the oxygen sensor box (51*a*). In addition, one end of the connection pipe (56) is coupled via a connector to one of the side surfaces of the oxygen sensor box (51*a*).

The carbon dioxide sensor (52) has a carbon dioxide sensor box (52*a*). The carbon dioxide sensor (52) is a non-dispersive infrared sensor which radiates infrared rays to the gas in the carbon dioxide sensor box (52*a*) to measure an absorption amount of infrared rays having a wavelength specific to carbon dioxide, thereby measuring the carbon dioxide concentration in the gas. The other end of the connection pipe (56) is coupled via a connector to one side surface of the carbon dioxide sensor box (52*a*). Furthermore, one end of the exhaust pipe (57) is coupled via a connector to the other side surface of the carbon dioxide sensor box (52*a*).

The fixing member (53) is fixed to the casing (12) with the oxygen sensor (51) and the carbon dioxide sensor (52) attached thereto.

The connection pipe (56) is, as described above, coupled to the one side surface of the oxygen sensor box (51*a*) and the one side surface of the carbon dioxide sensor box (52*a*), and allows the internal space of the oxygen sensor box (51*a*) to communicate with the internal space of the carbon dioxide sensor box (52*a*).

As described above, the exhaust pipe (57) has one end coupled to the other side surface of the carbon dioxide sensor box (52*a*), and the other end open near the suction port of the internal fans (26). That is, the exhaust pipe (57) allows the internal space of the carbon dioxide sensor box (52*a*) to communicate with the primary space (S21) of the internal storage space (S2).

As can be seen, the secondary and primary spaces (S22) and (S21) of the internal storage space (S2) communicate with each other via an air passage (58) formed by the membrane filter (54), the internal space of the oxygen sensor box (51*a*), the connection pipe (56), the internal space of the carbon dioxide sensor box (52*a*), and the exhaust pipe (57). Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor (52) are connected. Thus, the air sequentially flows from the interior of the container to the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Measurement Unit]

The measurement unit (80) includes a branch pipe (81) and a measurement on-off valve (82), and is configured to diverge, and guide to the oxygen sensor (51), part of nitrogen-enriched air produced in the gas supply device (30) and passing through the supply passage (44).

Specifically, the branch pipe (81) has one end connected to the supply passage (44), and the other end coupled to the oxygen sensor box (51*a*) of the oxygen sensor (51). According to this configuration, the branch pipe (81) allows the supply passage (44) to communicate with the internal space of the oxygen sensor box (51*a*). In this embodiment, the branch pipe (81) is branched from the supply passage (44) in the unit case (70) and extends from the interior to exterior of the unit case (70). The branch pipe (81) is made of a flexible tube (hereinafter referred to as a "measurement tube (81)").

The measurement on-off valve (82) is provided for the branch pipe (81) in the unit case. The measurement on-off valve (82) is comprised of a solenoid valve switching between an open state where the flow of nitrogen-enriched air in the branch pipe (81) is allowed, and a closed state where the flow of the nitrogen-enriched air in the branch pipe (81) is blocked. The controller (55) controls an opening/closing operation of the measurement on-off valve (82). As will be described in detail later, the measurement on-off valve (82) is open only when a supply air measurement operation to be described later is performed, and is closed in the other modes.

[Controller]

Figure 8:
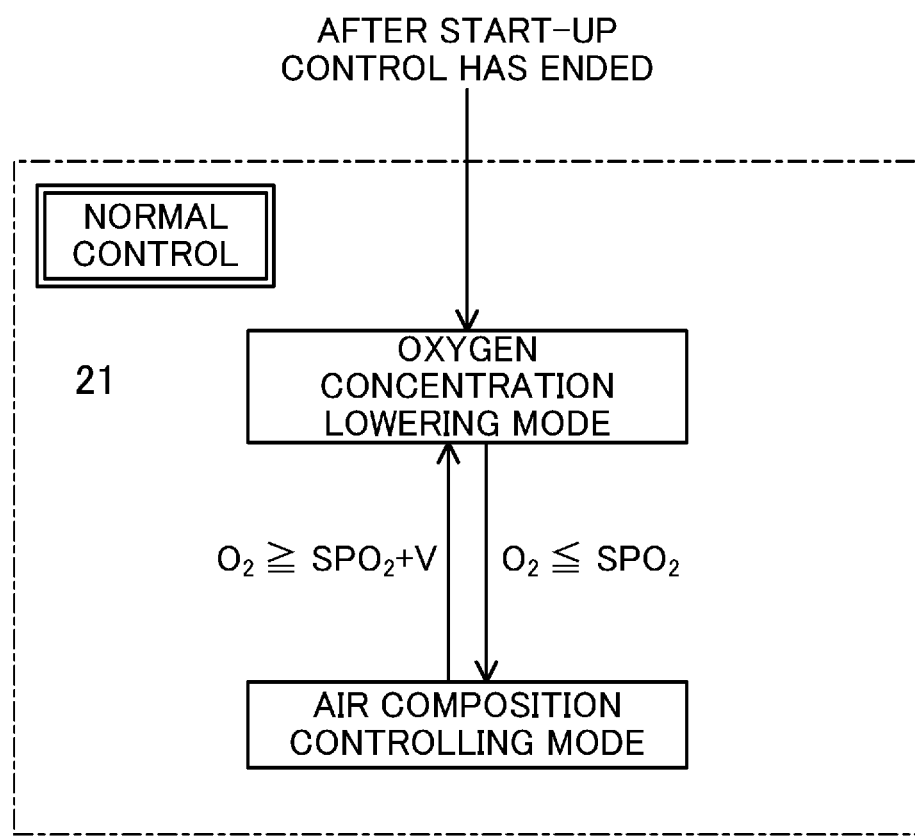
FIG. 8 illustrates how the mode is changed during normal control according to the first embodiment.

The controller (55) is configured to perform a concentration control operation for controlling the oxygen concentration and carbon dioxide concentration of the air in the container (11) to desired concentrations, respectively. Specifically, the controller (55) controls the operation of the gas supply device (30) and the exhaust portion (46) based on measurement results obtained by the oxygen sensor (51) and the carbon dioxide sensor (52) so that the oxygen concentration and carbon dioxide concentration of the air in the container (11) are controlled to desired target concentrations (e.g., 5% oxygen and 5% carbon dioxide). As shown in FIG. 8, in this embodiment, the controller (55) is configured to perform start-up control and normal control to carry out the concentration control operation. Further, the controller (55) is configured to perform the normal control after the predetermined start-up control has ended, and to perform control in an oxygen concentration lowering mode or an air composition controlling mode during the normal control.

In addition, the controller (55) is configured to control the operation of the measurement on-off valve (82) in accordance with a command entered by a user or periodically so as to perform a supply air measurement operation of measuring the oxygen concentration of the nitrogen-enriched air produced by the gas supply device (30).

Further, the controller (55) is configured to control the operation of the air pump (31) and the first and second open/close valves (67) and (68) in accordance with a command entered by a user or periodically so as to perform an internal pressure measurement operation for measuring the pressure of the container (11), an external pressure measurement operation for measuring the pressure of the outside air, and a pressure equalization operation for equalizing the pressure of the container (11) with the pressure of the outside air.

—Draining Structure—

Figure 7A:
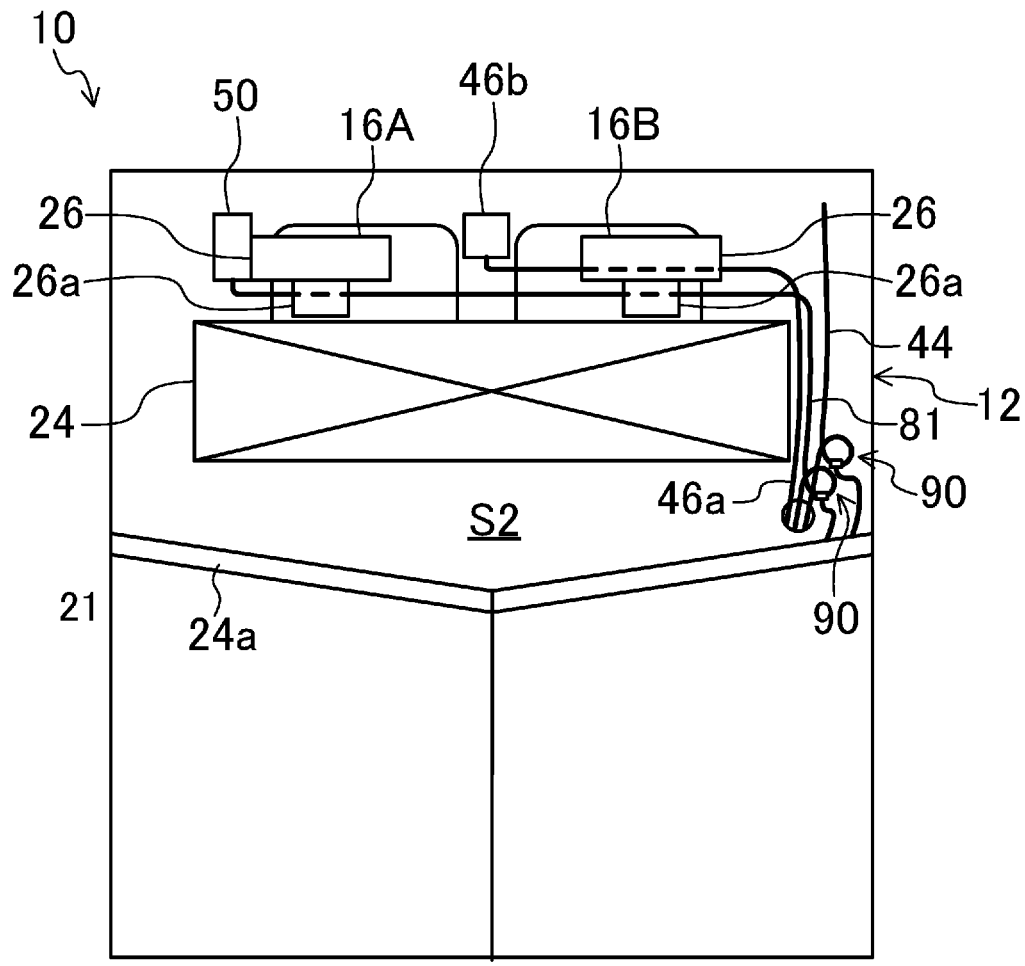
FIG. 7(A) is a side view illustrating the container refrigeration apparatus of the first embodiment as viewed from outside.

In this embodiment, as shown in FIGS. 6(A) and 7(A), the supply tube (44), the measurement tube (81), and the exhaust tube (46*a*) are inserted in the through hole (12*d*) formed in the casing (12) to allow the interior and exterior of the casing (12) to communicate with each other. Just like the exhaust tube (46*a*), the supply tube (44) and the measurement tube (81) are also inserted in the through hole (12*d*) of the casing (12) to penetrate the casing (12). Each of the supply tube (44) and the measurement tube (81) has an inlet end connected to the air circuit (3) of the gas supply device (30), and an outlet end opening in the secondary space (S22) of the internal storage space (S2).

The interior of the container (11) is cooled through the refrigeration cycle performed by the refrigerant circuit (20). Thus, condensation may possibly occur in the three tubes (the exhaust tube (46*a*), the supply tube (44), and the measurement tube (81)) extending from the exterior to interior of the container due to the difference between the temperatures in the interior and exterior of the container.

Figure 6B:
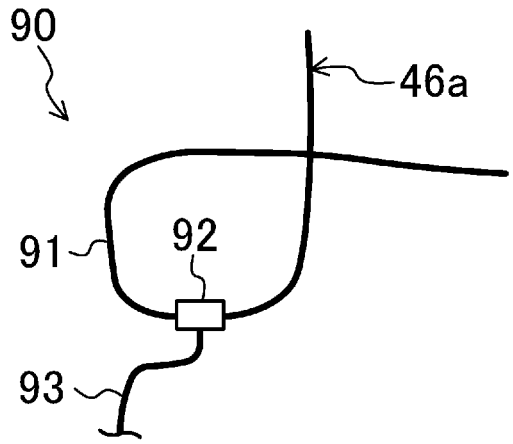
FIG. 6(B) is an enlargement of part of FIG. 6(A).
Figure 7B:
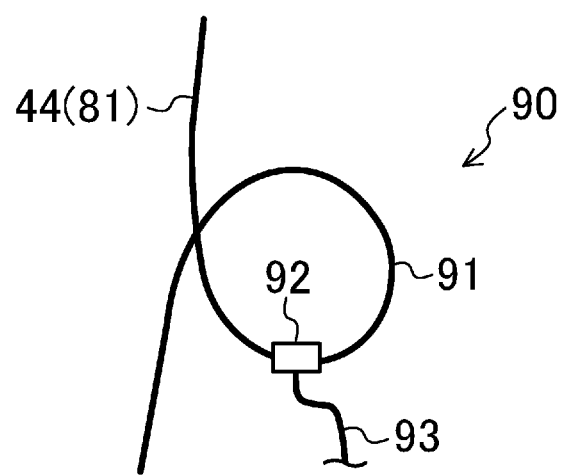
FIG. 7(B) is an enlargement of part of FIG. 7(A).

According to this embodiment, as shown in FIGS. 6(A) and 7(A), each of the three tubes (44, 81, 46a) is provided with a draining structure (90) for draining condensed water generated in these tubes (44, 81, 46a). The draining structure (90) provided for each of the three tubes (44, 81, 46a) includes, as shown in FIGS. 6(B) and 7(B), a trap (91), a pipe joint (92), and a draining tube (93). The trap (91) is obtained by forming an associated flexible tube (44, 81, 46a) into a loop, and binding an overlapping portions of the tube (44, 81, 46a) with a tie or any other suitable component. The pipe joint (92) is attached to a portion of the trap (91) except for the bound portion. The draining tube (93) has one end connected to the pipe joint (92), and the other end opening outside the casing (12).

This draining structure (90) is arranged such that the pipe joint (92) is located at the lowermost position of the trap (91). Thus, condensed water generated in the tubes (44, 81, 46a) accumulates around the pipe joint (92) located at the lowermost position of the trap (91) by gravity when passing through the trap (91) together with the air, and is exhausted out of the casing (12) via the draining tube (93).

If the outside air temperature is remarkably low and is lower than the temperature of the air in the container (11), the air may be abruptly cooled to cause condensation in a portion of the exhaust tube (46a) guiding the air from the interior to exterior of the container (11), i.e., an external portion of the exhaust tube (46a) in the exterior of the container. Thus, as shown in FIG. 6(A), the draining structure (90) is provided in the external portion of the exhaust tube (46a) in the external storage space (S1). Further, the draining structure (90) is provided in the external portion of the exhaust tube (46a) to be adjacent to the through hole (12d) which allows the interior and exterior of the casing (12) to communicate with each other (at a position just close to an external opening of the through hole (12d) in this embodiment). Thus, condensed water generated in the exhaust tube (46a) can be trapped near the condensation spot, and drained outside. In addition, as shown in FIG. 6(A), the external portion of the exhaust tube (46a) extends downward from the trap (91) toward the outlet end of the exhaust tube (46a) which opens on the suction side of the external fan (25). Thus, even if seawater reached the outlet end of the exhaust tube (46a), the seawater would not flow into the container through the exhaust tube (46a) against gravity.

As for the supply tube (44) and the measurement tube (81) through which the air (the nitrogen-enriched air and the air having the same composition as the outside air) is guided from the gas supply device (30) disposed outside the container (11) to the interior of the container, the air may be abruptly cooled to cause condensation in internal portions of these tubes (44, 81) in the interior of the container if the temperature of the air in the container (11) is lower than the temperature of the outside air. Thus, as shown in FIG. 7(A), the draining structure (90) is provided in each of the internal portions of the tubes (44, 81) in the internal storage space (S2). Further, the draining structure (90) is provided in each of the internal portions of the tubes (44, 81) to be adjacent to the through hole (12d) which allows the interior and exterior of the casing (12) to communicate with each other (at a position just close to an internal opening of the through hole (12d) in this embodiment). In addition, in the secondary space (S22), the outlet end of each of the tubes (44, 81) opens on an upper surface of a drain pan (24a) which receives condensed water generated in the evaporator (24). In this configuration, condensed water generated in the tubes (44, 81) can be trapped near the condensation spot, and drained outside together with drainage of the evaporator (24).

—Operations—

<Operation of Refrigerant Circuit>

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the container (11) via the blowout port (18b). Thus, the air in the container (11) is cooled.

<Concentration Control Operation>

In this embodiment, the controller (55) shown in FIG. 4 instructs the CA system (60) to perform a concentration control operation of controlling the composition of the air in the container (11) (oxygen concentration and carbon dioxide concentration) to a desired composition (e.g., 5% oxygen and 5% carbon dioxide) based on the measurement results obtained by the oxygen sensor (51) and the carbon dioxide sensor (52). The controller (55) performs the concentration control operation by executing start-up control and normal control. During the normal control, the controller (55) performs the control in an oxygen concentration lowering mode or an air composition controlling mode so as to control the oxygen concentration and carbon dioxide concentration of the air in the container (11) to desired target concentrations SP, respectively.

During the concentration control operation, the controller (55) instructs the measurement on-off valve (82) to close. Further, during the concentration control operation, the controller (55) communicates with the unit controller (100) to instruct the unit controller (100) to rotate the internal fans (26). Thus, the air in the container is supplied to the oxygen sensor (51) and the carbon dioxide sensor (52), and then the oxygen concentration and carbon dioxide concentration of the air in the container are measured.

Specifically, as shown in FIG. 8, the controller (55) performs the control in the oxygen concentration lowering mode during the normal control after the start-up control has ended. Then, if the oxygen concentration of the air in the container (11) measured by the oxygen sensor (51) is lowered to a target oxygen concentration $SPO_2$ (5% in this embodiment), the controller (55) finishes the control in the oxygen concentration lowering mode and starts the control in the air composition controlling mode. In the air composition controlling mode, if the oxygen concentration of the air in the container (11) measured by the oxygen sensor (51) reaches or exceeds a certain concentration (6.0% in this embodiment), which is the sum of the target oxygen concentration $SPO_2$ (5% in this embodiment) and a predetermined concentration V (1.0% in this embodiment), the controller (55) finishes the control in the air composition controlling mode and returns to the oxygen concentration lowering mode. The oxygen concentration lowering mode and air composition controlling mode under the normal control will be described in detail below.

[Oxygen Concentration Lowering Mode]

Figure 9:
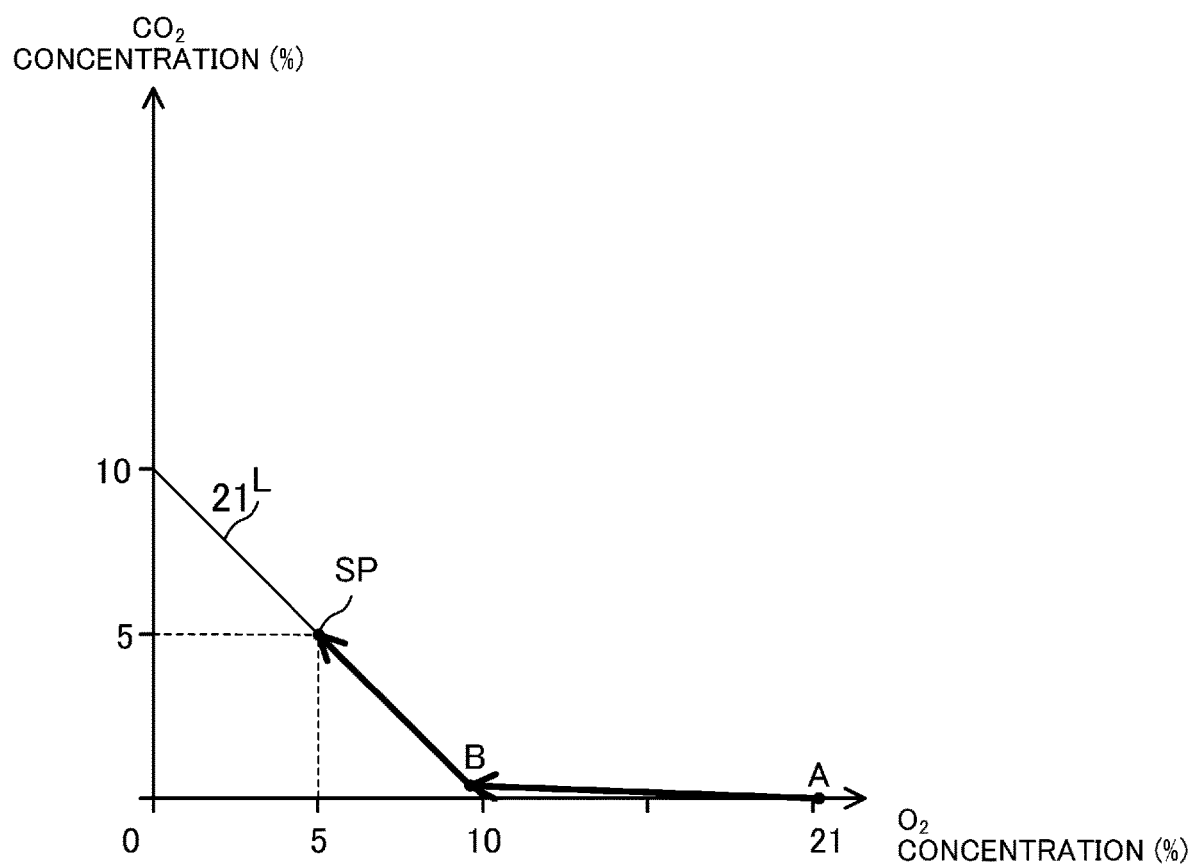
FIG. 9 is a graph illustrating how the composition of the air in a container changes during a concentration control operation in the container refrigeration apparatus of the first embodiment.

In the oxygen concentration lowering mode, first, the controller (55) switches the air circuit (3) to the first flow state, and performs a gas supply operation of producing nitrogen-enriched air (consisting of 90% nitrogen and 10% oxygen) in the air circuit (3) and supplying the nitrogen-enriched air to the interior of the container (11). Simultaneously, the controller (55) instructs the exhaust valve (46b) of the exhaust portion (46) to open to perform an exhaust operation, so that the air in the container (11) is exhausted to the exterior of the container only by the amount of the nitrogen-enriched air supplied to the interior of the container (11) during the gas supply operation. Through the gas supply operation and exhaust operation thus performed, the air in the container is replaced with the nitrogen-enriched air. Thus, the oxygen concentration of the air in the container is lowered (from point A to point B in FIG. 9).

When the sum of the oxygen concentration and carbon dioxide concentration of the air in the container (11) reaches the sum of the target concentrations, i.e., the sum of the target oxygen concentration $SPO_2$ and the target carbon dioxide concentration $SPCO_2$ (reaches the point B in FIG. 9), the controller (55) stops the gas supply operation and the exhaust operation.

When the gas supply operation and the exhaust operation are stopped, the air in the container (11) is no longer replaced. Therefore, the composition of the air in the container changes only due to the respiration of the plants (15). Through the respiration, the plants (15) take oxygen in, and release the same volume of carbon dioxide as the oxygen taken in. Thus, as the plants (15) respire, the oxygen concentration of the air in the container (11) decreases, and the carbon dioxide concentration increases by the amount of decrease of the oxygen concentration, with the sum of the oxygen concentration and carbon dioxide concentration of the air in the container remaining unchanged. Thus, after the gas supply operation and the exhaust operation have been stopped, the composition of the air in the container (11) changes, as a result of the respiration of the plants (15), along the straight line L having an inclination of −1 and passing the target composition point SP (where the oxygen concentration is 5% and the carbon dioxide concentration is 5%) in a direction in which the oxygen concentration decreases and the carbon dioxide concentration increases. That is, after the gas supply operation and the exhaust operation have been stopped at an arbitrary point on the straight line L, the composition of the air in the container (11) may be controlled to the target composition only by making use of the respiration of the plants (15).

Thereafter, when the oxygen concentration of the air in the container decreases to the target oxygen concentration $SPO_2$ (5% in this embodiment) or lower, the controller (55) finishes the control in the oxygen concentration lowering mode, and starts the control in the air composition controlling mode.

[Air Composition Controlling Mode]

<<Control of Oxygen Concentration>>

In the air composition controlling mode, the controller (55) performs oxygen concentration increasing control of increasing the oxygen concentration of the air in the container if the oxygen concentration of the air in the container falls below a lower limit value (4.5% in this embodiment), which is lower than the target oxygen concentration $SPO_2$ (5% in this embodiment) only by the predetermined concentration X (0.5% in this embodiment).

In the oxygen concentration increasing control, the controller (55) switches the air circuit (3) to the second flow state, and performs an outside air introduction operation of supplying the air in the air circuit (3) having the same composition as the outside air (the air produced by mixing the nitrogen-enriched air and the oxygen-enriched air) to the interior of the container (11). Simultaneously, the controller (55) instructs the exhaust valve (46b) of the exhaust portion (46) to open to perform the exhaust operation, so that the air in the container is exhausted out of the container only by the amount of the air having the same composition as the outside air supplied to the interior of the container (11) during the outside air introduction operation. Through the outside air introduction operation and exhaust operation thus performed, the air in the container is replaced with the air having the same composition as the outside air, and thus, the oxygen concentration of the air in the container (11) increases.

If the oxygen concentration of the air in the container reaches or exceeds a certain value (5.5% in this embodiment) which is higher than the target oxygen concentration $SPO_2$ (5% in this embodiment) only by the predetermined concentration X (0.5% in this embodiment), the controller (55) stops the outside air introduction operation and the exhaust operation. Thus, the oxygen concentration increasing control ends.

<<Control of Carbon Oxide Concentration>>

Further, in the air composition controlling mode, the controller (55) performs carbon dioxide concentration lowering control to lower the carbon dioxide concentration of the air in the container if the carbon dioxide concentration of the air in the container reaches or exceeds an upper limit value (5.5% in this embodiment), which is higher than the target carbon dioxide concentration $SPCO_2$ (5% in this embodiment) only by the predetermined concentration Y (0.5% in this embodiment).

During the carbon dioxide concentration lowering control, the controller (55) first switches the air circuit (3) to the first flow state, and performs the gas supply operation of producing nitrogen-enriched air (consisting of 90% nitrogen and 10% oxygen) in the air circuit (3) and supplying the nitrogen-enriched air to the interior of the container (11). Simultaneously, the controller (55) instructs the exhaust valve (46b) of the exhaust portion (46) to open to perform an exhaust operation, so that the air in the container (11) is exhausted to the exterior of the container only by the amount of the nitrogen-enriched air supplied to the interior of the container (11) during the gas supply operation. Through the gas supply operation and exhaust operation thus performed, the air in the container is replaced with the nitrogen-enriched air. Thus, the carbon dioxide concentration of the air in the container (11) is lowered.

If the carbon dioxide concentration of the air in the container falls below a certain value (4.5% in this embodiment) which is lower than the target carbon dioxide concentration $SPCO_2$ (5% in this embodiment) only by the predetermined concentration Y (0.5% in this embodiment), the controller (55) stops the gas supply operation and the exhaust operation, and ends the carbon dioxide concentration lowering control.

Note that, in the carbon dioxide concentration lowering control, the gas supply operation may be replaced with the outside air introduction operation of producing the air having the same composition as the outside air in the air circuit (3) (the air produced by mixing the nitrogen-enriched air and the oxygen-enriched air) and supplying the air thus produced to the interior of the container (11) with the air circuit (3) switched to the second flow state.

[Supply Air Measurement Operation]

Further, the controller (55) performs a supply air measurement operation of measuring the oxygen concentration of the nitrogen-enriched air produced in the gas supply device (30) in accordance with a command entered by a user or periodically (e.g., every ten days). Note that the supply air measurement operation is performed concurrently when the internal fans (26) are stopped during a gas supply operation for the concentration control operation described above or test run.

When the measurement on-off valve (82) is opened during the gas supply operation, part of the nitrogen-enriched air passing through the supply passage (44) flows into the branch pipe (81). The nitrogen-enriched air that has flowed into the branch pipe (81) flows into the oxygen sensor box (51*a*) of the oxygen sensor (51), which then measures the oxygen concentration.

If the oxygen concentration of the nitrogen-enriched air produced in the gas supply device (30) is measured in this way, it may be determined whether or not the composition of the nitrogen-enriched air produced in the gas supply device (30) (oxygen concentration and nitrogen concentration) is in a desired state (consisting of 90% nitrogen and 10% oxygen, for example).

Advantages of First Embodiment

As can be seen in the foregoing, according to the first embodiment, the exhaust tube (exhaust passage) (46*a*) is open on the suction side of the external fan (25) in the external storage space (S1). Thus, rotation of the external fan (25) allows the pressure on the suction side of the external fan (25), around which the external end of the exhaust tube (46*a*) opens, to become lower than the pressure on the blowout side of the internal fans (26) around which the internal end of the exhaust tube (46*a*) opens. Thus, even if the pressure in the container (11) is lower than the outside pressure, the external fan (25) allows the pressure in a space in which the internal end of the exhaust tube (46*a*) opens to become higher than the pressure in a space in which the external end of the exhaust tube (46*a*) opens. Due to the pressure difference between the ends of the exhaust tube (46*a*) caused by the rotation of the external fan (25), the air in the internal storage space (S2) communicating with the interior of the container (inside air) can be smoothly exhausted out of the container. Therefore, the composition of the air in the container (oxygen concentration and carbon dioxide concentration) may quickly and accurately be controlled to a desired composition.

Further, according to the first embodiment, the external portion of the exhaust tube (46*a*) is entirely disposed in the second space (S12) of the external storage space (S1) downstream of the condenser (22) in the direction of the flow of the outside air. With the exhaust tube (46*a*) thus arranged, the air flowing from the interior of the container into the exhaust tube (46*a*) is heated in the entire external portion of the exhaust tube (46*a*) by the outside air that has been heated by the refrigerant when passing through the condenser (22). Even if the outside air temperature is remarkably low, condensation in the entire external portion of the exhaust tube (46*a*) may be substantially prevented. Consequently, condensed water generated in the exhaust tube (46*a*) would not be exhausted from the end of the exhaust tube (46*a*) together with the air in the container, or sprayed onto the external fan (25) or the condenser (22), thereby substantially preventing corrosion of the external fan (25) or the condenser (22) due to adhesion of condensed water.

Further, according to the first embodiment, the external portion of the exhaust tube (46*a*), in which condensation may possibly occur, is provided with a draining structure (90) which drains condensed water outside. Thus, water condensed in the exhaust tube (46*a*) can be drained outside via the draining structure (90), which may prevent the condensed water from flowing into the interior of the container.

Moreover, according to the first embodiment, the draining structure (90) can be provided easily from the trap (91) which forms part of the exhaust tube (46*a*) and the draining tube (93) connected to the trap (91).

Further, according to the first embodiment, the draining structure (90) is provided in the external portion of the exhaust tube (46*a*), in which condensation may possibly occur, to be adjacent to the through hole (12*d*). Thus, condensed water generated in the exhaust tube (46*a*) may be trapped near the condensation spot, and drained outside.

Second Embodiment

Figure 10:
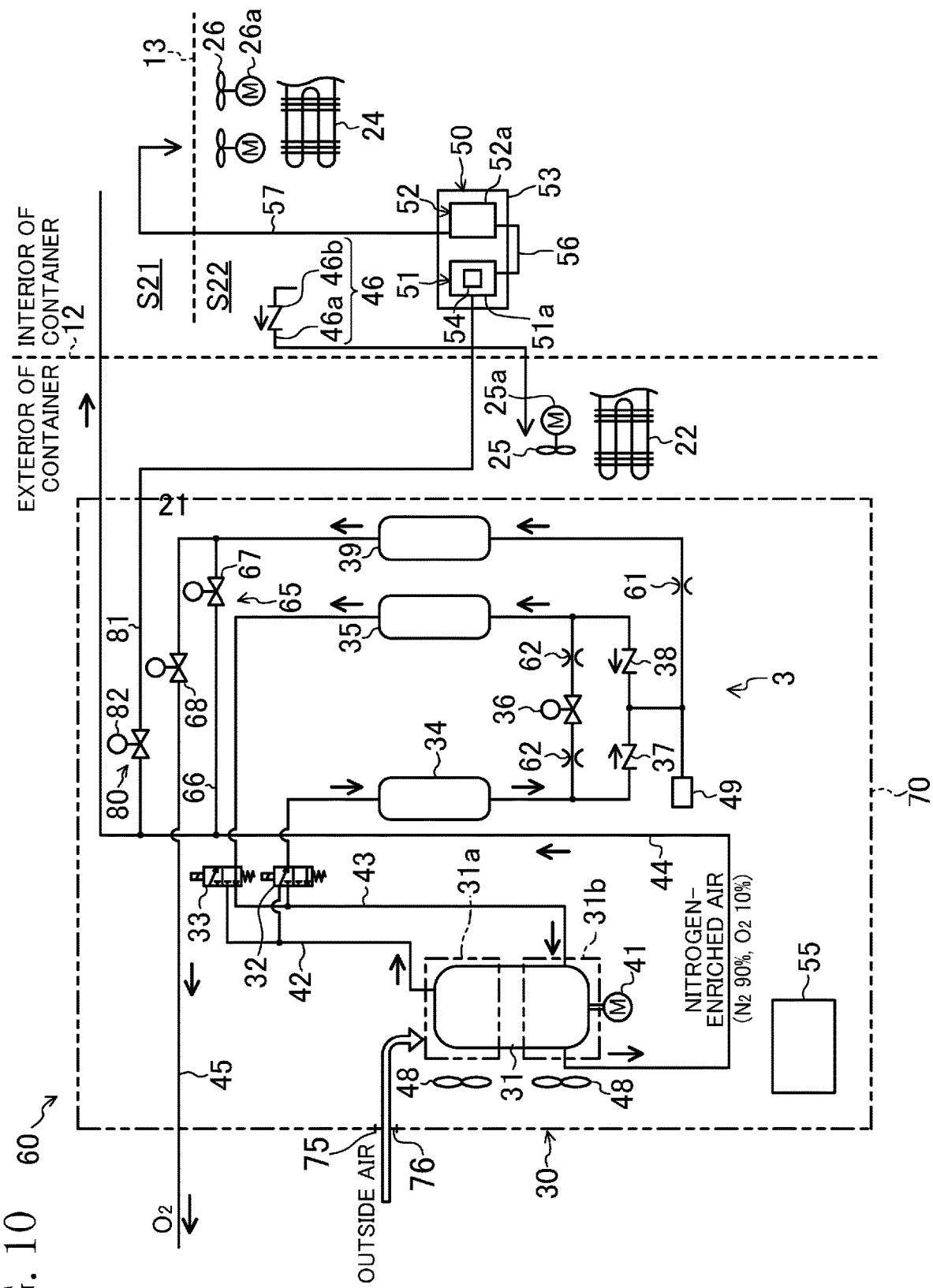
FIG. 10 is a piping diagram illustrating a configuration of a CA system in a container refrigeration apparatus of a second embodiment.

As shown in FIG. 10, a container refrigeration apparatus of a second embodiment is a modified version of the container refrigeration apparatus (10) of the first embodiment, in which the configuration of the exhaust portion (46) has been modified.

Specifically, in the second embodiment, the exhaust valve (46*b*) comprised of a solenoid valve in the first embodiment is replaced with a check valve which opens if a pressure difference between the ends of the valve reaches or exceeds a predetermined value. The exhaust valve (46*b*) comprised of a check valve is arranged in the exhaust tube (46*a*), which penetrates the casing (12) to communicate with the interior and exterior of the casing (12), to be adjacent to the interior of the container such that the air is allowed to flow only from the interior to exterior of the casing, and is prevented from flowing in the opposite direction.

According to the second embodiment including the exhaust valve (46*b*) comprised of a check valve, the pressure in the container (11) becomes higher than the pressure in the second space (S12) on the suction side of the external fan (25) when the gas supply operation and the outdoor air introducing operation are performed. If the pressure difference reaches or exceeds a predetermined pressure value, the exhaust valve (46*b*) opens to exhaust the air in the container (11) outside through the exhaust tube (46*a*).

Advantages of Second Embodiment

As can be seen, according to the second embodiment, the exhaust valve (46*b*) is automatically opened or closed based on the difference between the pressure in the container (11) and the pressure in the second space (S12) without being controlled by the controller (55), just like in the first embodiment. Thus, the pressure in the container (11) is stabilized at a higher level than the pressure in the exterior second space (S12) only by the predetermined pressure value. As a result, the gas supply operation and the outside air introducing operation are stably performed. Thus, the composition of the air in the container (11) (oxygen concentration and carbon dioxide concentration) may be controlled easily and accurately.

Third Embodiment

Figure 11:
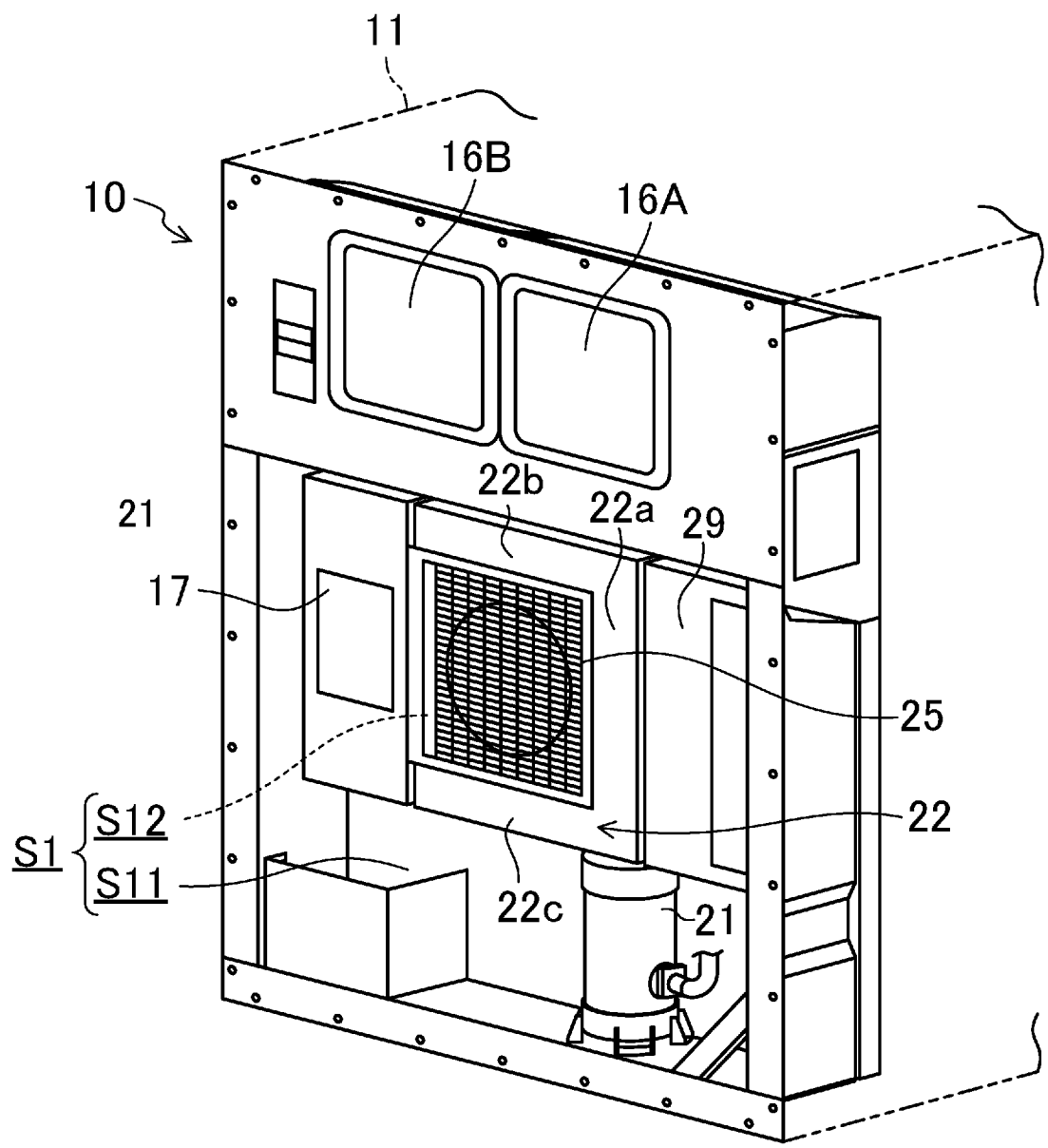
FIG. 11 is a schematic perspective view illustrating a container refrigeration apparatus of a third embodiment as viewed from outside.

As shown in FIG. 11, a third embodiment is a modified version of the first and second embodiments, in which the positional relationship among the condenser (22), the external fan (25), the electrical component box (17), and the inverter box (29) in the external storage space (S1) is modified.

Specifically, according to the third embodiment, the condenser (22), which has extended linearly in a horizontal direction in the first and second embodiments, has three heat exchange surfaces (22a, 22b, 22c) arranged in the shape of U. The condenser (22) is placed above the center of the external storage space (S1) with the heat exchange surface (22a) serving as a top surface, the heat exchange surface (22b) as a right side surface, and the heat exchange surface (22c) as a bottom surface. Further, the external fan (25) that has been arranged above the condenser (22) in the first and second embodiments is placed inside the U-shaped condenser (22). Likewise, the electrical component box (17) that has been arranged above the condenser (22) in the first and second embodiments is placed on the left side of the condenser (22) in FIG. 11. The inverter box (29) that has been arranged below the condenser (22) in the first and second embodiments is placed on the right side of the condenser (22) in FIG. 11.

Also in the third embodiment, the condenser (22) divides the external storage space (S1) into a first space (S11) upstream of the condenser (22) and a second space (S12) downstream of the condenser (22) in the direction of the outside air flow. Thus, the external fan (25) arranged inside the condenser (22) is disposed in the second space (S12). Further, also in the third embodiment, the first space (S11) is open toward the outside of the container (11). A plate member is arranged to cover a front end (a front end in FIG. 11) and a left end of the second space (S12) so that only a blowout port of the external fan (25) is open toward the outside. In this embodiment, a right side surface of the electrical component box (17) covers a left end of the second space (S12). Also in the third embodiment, an external end of the exhaust passage (46a) in the exterior of the container opens in the second space (S12), although not shown. Specifically, the external end of the exhaust passage (46a) opens on the rear side of the external fan (25) in the second space (S12) and inside the U-shaped condenser (22) in FIG. 11.

The advantages of the first and second embodiments can also be achieved in this configuration.

OTHER EMBODIMENTS

The above-described embodiments may be modified in the following manner.

According to the above-described embodiment, the trap (91) of the draining structure (90) has been obtained by forming a flexible tube (44, 81, 46a) into a loop, and overlapping portions of the tube (44, 81, 46a) are bound together with a tie or any other suitable component. However, the trap (91) may have any shape as long as it can temporarily store condensed water, and may have the shape of U, or S, for example.

Further, according to the above-described embodiments, a portion of the exhaust tube (exhaust passage) (46a) in the external space of the container has been entirely disposed in the second space (S12) of the external storage space (S1) downstream of the condenser (22) in the direction of the outside air flow. However, in order to lower the possibility of the condensation in the exhaust tube (46a), it is not necessary to dispose the external portion of the exhaust tube (46a) entirely in the second space (S12), and the external portion may be at least partially disposed in the second space (S12). With the external portion of the exhaust tube (46a) at least partially disposed in the second space (S12), the air flowing from the interior of the container into the exhaust tube (46a) is heated by the outside air that has been heated when passing through the condenser (22). Thus, the condensation may be prevented from occurring. Moreover, if only a portion of the exhaust tube (46a) downstream of the draining structure (90) is arranged in the second space (S12), condensed water generated in a portion of the exhaust tube (46a) upstream of the draining structure (90) is drained outside by the draining structure (90). The portion of the exhaust tube (46a) downstream of the draining structure (90) is heated by the outside air that has been heated when passing through the condenser (22). Thus, the condensation itself may be prevented from occurring. Consequently, condensed water generated in the exhaust passage (46a) would not be exhausted from the end of the exhaust passage (46a) together with the air in the container, or sprayed onto the external fan (25) or the condenser (22), thereby substantially preventing corrosion of the external fan (25) or the condenser (22) due to adhesion of condensed water.

According to the above-described embodiments, a single air pump (31) has been configured to include the first and second pump mechanisms (31a) and (31b). However, the first and second pump mechanisms (31a) and (31b) may be configured as two separate air pumps.

Moreover, according to the above-described embodiments, two adsorption columns have been used as first and second adsorption portions, respectively, for adsorption and desorption of nitrogen. However, the number of the adsorption columns serving as a single adsorption portion is not limited to one. For example, each of the first and second adsorption portions may be comprised of three adsorption columns, i.e., six adsorption columns in total may be used.

In addition, according to the above-described embodiments, the CA system (60) of the present invention has been applied to a container refrigeration apparatus (10) provided for a container (11) for use in marine transportation. However, the CA system (60) of the present invention is not limited to such applications. The CA system (60) of the present invention may be used to control the composition of the air in, not only a container for use in marine transportation, but also a container for use in land transportation, a simple refrigerated storage, a normal temperature storage, or any other suitable storage, for example.

INDUSTRIAL APPLICABILITY

As can be seen in the foregoing, the present invention is useful for a container refrigeration apparatus which cools air in a container and controls the composition of the air in the container.

DESCRIPTION OF REFERENCE CHARACTERS

S1 External Storage Space
S2 Internal Storage Space
S12 Second Space
10 Container Refrigeration Apparatus
11 Container
11 Casing
12d Through Hole
15 Plant 20 Refrigerant Circuit
22 Condenser
24 Evaporator
25 External Fan
26 Internal Fan
46a Exhaust Tube (Exhaust Passage)
60 CA System (Inside Air Control System)
90 Draining Structure
91 Trap
93 Draining Tube

The invention claimed is:

1. A container refrigeration apparatus, comprising:
a casing which is attached to an open end of a container for housing a respiring plant, and forms an external storage space communicating with the exterior of the container and an internal storage space communicating with the interior of the container;
a refrigerant circuit in which a condenser disposed in the external storage space and an evaporator disposed in the internal storage space are connected together to perform a refrigeration cycle;
an external fan which is disposed in the external storage space, and guides outside air into the external storage space to form a flow of the outside air toward the condenser;
an internal fan which is disposed in the internal storage space, and guides inside air in the container into the internal storage space to form a flow of the inside air toward the evaporator; and
an inside air control system controlling the composition of the inside air in the interior of the container, the inside air control system including
a controller,
a gas supply device including at least one adsorption column provided with an absorbent adsorbing nitrogen in air, a first pump which supplies pressurized outside air to the at least one adsorption column, and a second pump which sucks the air from the at least one adsorption column and supplies nitrogen-enriched air having a higher nitrogen concentration than the outside air to the internal storage space,
an exhaust passage having an inlet end disposed on a blowout side of the internal fan in the internal storage space and an external end open on a suction side of the external fan in the external storage space, and
an exhaust valve that opens and closes the exhaust passage, wherein
the controller opens the exhaust valve during operation of the external fan such that the inside air flows from the internal storage space through the exhaust passage to the external storage space and outside the container even if the pressure in the interior of the container is lower than the pressure of the outside air.

2. The container refrigeration apparatus of claim 1, wherein
the external storage space is divided by the condenser into a first space upstream of the condenser, and a second space downstream of the condenser in a direction of the flow of the outside air,
the external fan is disposed in the second space,
the second space is closed such that only a blowout port of the external fan is open toward the exterior of the container, and
the external end of the exhaust passage is open in the second space.

3. The container refrigeration apparatus of claim 2, wherein
the exhaust passage is made of a tube which is inserted in a through hole formed through the casing to penetrate the casing, and
a draining structure is provided in an external portion of the tube extending in the external storage space, the draining structure including a trap which forms part of the tube and stores the condensed water, and a draining tube connected to the trap to guide the condensed water stored in the trap out of the container.

4. The container refrigeration apparatus of claim 3, wherein the draining structure is disposed in the external portion of the tube to be adjacent to the through hole.

5. The container refrigeration apparatus of claim 3, wherein part of the external portion of the tube downstream of the draining structure is disposed in the second space.

6. The container refrigeration apparatus of claim 1, wherein
the external storage space is divided by the condenser into a first space upstream of the condenser, and a second space downstream of the condenser in a direction of the flow of the outside air, and
an external portion of the exhaust passage extending in the external storage space is at least partially disposed in the second space.

7. The container refrigeration apparatus of claim 6, wherein the external portion of the exhaust passage is entirely disposed in the second space.

8. The container refrigeration apparatus of claim 6, wherein
the exhaust passage is made of a tube which is inserted in a through hole formed through the casing to penetrate the casing, and
a draining structure is provided in an external portion of the tube extending in the external storage space, the draining structure including a trap which forms part of the tube and stores the condensed water, and a draining tube connected to the trap to guide the condensed water stored in the trap out of the container.

9. The container refrigeration apparatus of claim 8, wherein the draining structure is disposed in the external portion of the tube to be adjacent to the through hole.

10. The container refrigeration apparatus of claim 8, wherein
part of the external portion of the tube downstream of the draining structure is disposed in the second space.

11. The container refrigeration apparatus of claim 1, wherein
the exhaust passage is made of a tube which is inserted in a through hole formed through the casing to penetrate the casing, and
a draining structure is provided in an external portion of the tube extending in the external storage space, the draining structure including a trap which forms part of the tube and stores the condensed water, and a draining tube connected to the trap to guide the condensed water stored in the trap out of the container.

12. The container refrigeration apparatus of claim 11, wherein the draining structure is disposed in the external portion of the tube to be adjacent to the through hole.

13. The container refrigeration apparatus of claim 11, wherein
the external storage space is divided by the condenser into a first space upstream of the condenser, and a second space downstream of the condenser in a direction of the flow of the outside air, and part of the external portion of the tube downstream of the draining structure is disposed in the second space.

* * * * *